United States Patent [19]

Wilkerson

[11] Patent Number: 5,014,153
[45] Date of Patent: May 7, 1991

[54] TRANSFORMER DIFFERENTIAL RELAY

[75] Inventor: Timothy M. Wilkerson, Highland, Ill.

[73] Assignee: Basler Electric Company, Highland, Ill.

[21] Appl. No.: 305,479

[22] Filed: Feb. 1, 1989

[51] Int. Cl.$^5$ ............................................. H02H 7/045
[52] U.S. Cl. ........................................ 361/36; 361/93
[58] Field of Search .................. 361/35, 36, 63, 87, 361/93, 94

[56] References Cited

U.S. PATENT DOCUMENTS

| | | | |
|---|---|---|---|
| 1,354,573 | 10/1920 | McColl . | |
| 1,729,099 | 9/1929 | Farley . | |
| 3,123,786 | 3/1964 | Evans | 336/155 |
| 3,170,133 | 2/1965 | Kernick | 336/165 |
| 3,323,016 | 5/1967 | Andersson | 361/36 |
| 3,337,772 | 8/1967 | Andersson | 361/36 |
| 3,360,753 | 12/1967 | Wroblewski | 336/165 |
| 3,377,551 | 4/1968 | Le Doux | 324/51 |
| 3,389,329 | 6/1968 | Quirk et al. . | |
| 3,414,772 | 12/1968 | Sonnemann | 361/36 |
| 3,423,634 | 1/1969 | Wagner | 361/36 |
| 3,479,583 | 11/1969 | Hemprich et al. | 324/51 |
| 3,564,275 | 2/1971 | Eberle et al. | 307/29 |
| 3,617,812 | 11/1971 | Deter . | |
| 3,624,533 | 11/1971 | Schiff | 330/30 |
| 3,754,163 | 8/1973 | Sykes | 361/35 |
| 3,801,920 | 4/1974 | Strickland | 330/10 |
| 3,808,465 | 4/1974 | Banks | 307/252 |
| 3,832,600 | 8/1974 | Specht | 361/35 |
| 3,974,423 | 8/1976 | Ulyanitsky et al. . | |
| 4,175,276 | 11/1979 | Smith | 361/36 |
| 4,204,237 | 5/1980 | Zocholl | 361/36 |
| 4,217,546 | 8/1980 | Milkovic | 324/142 |
| 4,292,545 | 9/1981 | Hingorani | 307/102 |
| 4,315,232 | 2/1982 | Spoldi et al. | 336/90 |
| 4,345,288 | 8/1982 | Kampf et al. | 361/31 |
| 4,402,028 | 8/1983 | Udren | 361/36 |
| 4,403,268 | 9/1983 | Kenney, Jr. | 361/80 |
| 4,477,854 | 10/1984 | Usui et al. | 361/36 |
| 4,495,463 | 1/1985 | Milkovic | 324/142 |
| 4,502,086 | 2/1985 | Ebisaka | 361/87 |
| 4,530,025 | 7/1985 | Usui | 361/87 |
| 4,661,877 | 4/1987 | Usui | 361/36 |
| 4,670,811 | 6/1987 | Eda | 361/45 |

OTHER PUBLICATIONS

Westinghouse Installation.Operation.Maintenance Instructions (Types HU and HU-1 Transformer Differential Relays), pp. 8-11, FIG. 9, Jan. 1976.
IEEE Transactions on Power Apparatus and Systems, vol. PAS-94, No. 6, Nov./Dec. 1975 (A Three-Phase Differential Relay for Transformer Protection—C. H. Einvall and J. R. Linders), pp. 1-3 and 5-6, FIG. 4.
IEEE Guide for Protective Relay Applications to Power Transformers (IEEE C37.91-1985), pp. 14-15, FIGS. 1, 2, and 6.

(List continued on next page.)

Attorney, Agent, or Firm—Senniger, Powers, Leavitt and Roedel

[57] ABSTRACT

An apparatus for monitoring phased currents in a first winding and a second winding of a transformer and for disconnecting the transformer from a power source supplying the transformer when a difference between the magnitude of the current in the first winding and the magnitude of the current in the second winding exceeds a predetermined amount to indicate a fault condition is disclosed. The apparatus is used in combination with circuitry for generating first and second current signals each having a phase and magnitude which is a function of the phase and magnitude of the phased currents in the first and second windings, respectively. The apparatus includes a circuit for shifting the phase of the second current signal to match the phase of the first current signal, a circuit for detecting a difference between the magnitude of the first current signal and the magnitude of the phase shifted second current signal, and a circuit for disconnecting the transformer from the power source when the detected difference exceeds the predetermiend amount.

56 Claims, 13 Drawing Sheets

OTHER PUBLICATIONS

Basler BE1-87G Variable Percentage Differential Relay brochure (UBK-3, 11-85), p. 3, FIG. 2, 1985.

ASEA Catalogue RK 62-10 E, Edition 4, Jan. 1978, File R, Part 1 (Transformer Differential Relay Type RADSE), FIGS. 7-8.

ASEA Catalogue RK 62-12 E, Edition 1, Sep. 1979, File R, Part 1 (Transformer Differential Protection Type RADSB), p. 1, FIG. 1.

Basler Specification for BE1-87G Variable Percentage Differential Relay with Drawing No. 9 1708 00 680, FIG. 1, 11-1985.

Basler Instruction Manual for Variable Percentage Differential Relay Model No. BE1-87G (Pub. No. 9 1708 00 990, Rev. B), pp. 1-2 and 3-1, FIG. 3-1, 10-1986.

IEEE Transactions on Power Apparatus and Systems, vol. PAS-104, No. 12, Dec. 1985 (Fault Induced Wave Distortion of Interest to Relay Engineers), p. 3577.

Westinghouse Installation.Operation.Maintenance Instructions I.L. 41-337.3C (Types CA-16 and CA-26 Percentage Differential Relays for Bus and Transformer Protection), pp. 3-4, FIG. 10, 8-1971.

Power Transformer Protection, Part IV (AIEE Trans., vol. 66, pp. 911-915, 1947), pp. 269, and 271-272.

G. E. Protective Relays 7275, Aug. 14, 1978 (Type BDD Percentage-Differential Relays with Harmonic Restraint), p. 1, FIG. 2.

Westinghouse Installation.Operation.Maintenance Instructions I.L. 41-332.2A (Type CA Percentage Differential Relay for Transformer Protection), FIG. 4, Jan. 1966.

*Primary Examiner*—Derek S. Jennings

TRANSFORMER DIFFERENTIAL RELAY

BACKGROUND OF THE INVENTION

This invention relates to an apparatus for protecting a transformer and more particularly to a transformer differential relay for disconnecting the transformer from a power source supplying the transformer upon the detection of an internal fault in the transformer.

Differential relays are applied as primary protection for power transformers rated 10 MVA or larger to permit the rapid isolation of the power transformer from a power source to limit damage to the transformer and to minimize the threat to system stability. In the prior art transformer differential relay current transformers are connected to the primary and secondary windings of the protected power transformer to monitor the magnitude of the currents flowing into and out of the transformer. An internal fault in the power transformer, is indicated when the current flow into the power transformer exceeds the current flow out. This difference is termed the differential or operating current. A current differential relay compares the differential current with a predetermined value, such as the larger of the primary and secondary winding currents, and when the differential current exceeds a percentage of the predetermined value the relay disconnects the power transformer from the power source.

Power transformers, by their very nature, have different values of rated current for their primary, secondary, and tertiary windings. Even with careful selection of current transformer ratios there may be considerable mismatch, between the primary and secondary current provided to the relay. If the relay does not compensate for this mismatch, then it may appear as a differential current in the relay. To obtain matching of unequal current transformer secondary currents, taps are provided to balance the currents applied to the measuring circuits of the relay. The traditional tap values are 2.9, 3.2, 3.5, 3.8, 4.6, 5.0, and 8.9. However, these traditional tap values have an effect on the accuracy of the relay.

Another problem unique to transformer differential relays is the 30° phase shift that occurs when the power transformer is connected wye/delta. If the 30° phase shift between the currents monitored in the primary winding and the secondary winding is not balanced then it may appear as a differential current to the relay and the relay will fail to operate properly. Traditionally, compensation for this problem has been accomplished outside the differential relay either by the current transformer connections or by using auxiliary current transformers. The most common method is to connect the current transformers to complement the power transformer connection. If the power transformer's primary is wye connected, its current transformers are connected delta; and if the power transformer's secondary is delta connected, its current transformers are connected wye. The auxiliary current transformer method utilizes additional current transformers to equalize the current to the relay and to compensate for the 30° phase shift associated with wye/delta connections.

Transformer differential relays are also subject to magnetizing inrush currents which will appear to be an internal fault. Magnetizing inrush currents can occur when the transformer is initially energized, when the transformer recovers from an external fault, or when a nearby transformer is energized. The magnetizing inrush current has a large second harmonic component. To prevent operation of the relay due to magnetizing inrush current, a harmonic restraint unit is used to detect the magnetizing inrush current. The harmonic restraint unit detects the magnetizing inrush current by comparing the differential current with the second harmonic or 120 Hz component of the differential current. The harmonic restraint unit prevents operation of the relay when the second harmonic component exceeds a predetermined percentage of the differential current.

Overexcitation of the protected transformer can generate an apparent differential current to flow which is not attributable to an internal fault. Although potentially dangerous, overexcitation is not an internal fault and therefore the relay should not operate. The overexcitation current has a complex waveform consisting principally of third and fifth harmonics. To prevent operation of the relay due to overexcitation, a harmonic restraint unit is used to detect the overexcitation current. The harmonic restraint unit detects the overexcitation current by comparing the differential current with the fifth harmonic component of the differential current. The harmonic restraint unit prevents operation of the relay when the fifth harmonic component exceeds a predetermined percentage of the differential current.

SUMMARY OF THE INVENTION

Among the several objects of the present invention is the provision of an improved transformer differential relay for proper operation when an internal fault is detected; to provide an improved transformer differential relay having tap adjusting circuitry for balancing currents applied to the relay; to provide an improved transformer differential relay which phase shifts the current representative signal to correct the 30° phase shift that occurs when the transformer is connected in a wye/delta or delta/wye configuration; and to provide an improved transformer differential relay which is convenient to use, economical, and reliable.

Generally, one form of the invention is an apparatus for monitoring phased currents in a first winding and a second winding of a transformer and for disconnecting the transformer from a power source supplying the transformer when a difference between the magnitude of the current in the first winding and the magnitude of the current in the second winding exceeds a predetermined amount to indicate a fault condition. The apparatus is used in combination with circuitry for generating first and second current signals each having a phase and magnitude which is a function of the phase and magnitude of the phased currents in the first and second windings, respectively. The apparatus includes a circuit for shifting the phase of the second current signal to match the phase of the first current signal, a circuit for detecting a difference between the magnitude of the first current signal and the magnitude of the phase shifted second current signal, and a circuit for disconnecting the transformer from the power source when the detected difference exceeds the predetermined amount.

In general, another form of the invention is a protective relay for a transformer including circuitry for generating first and second current signals each having a phase and magnitude which is a function of the phase and magnitude of phased currents in a first winding and a second winding of the transformer and a circuit for scaling the magnitude of the first and second current signals. The relay further includes a circuit for shifting the phase of the scaled second current signal to match the phase of the scaled first current signal, a circuit for detecting a difference between the magnitude of the scaled first current signal and the magnitude of the scaled phase shifted second current signal, and a circuit for disconnecting the transformer from a power source supplying the transformer when the detected difference exceeds a predetermined amount.

Another form of the present invention involves a system for operating a circuit breaker to disconnect a transformer from its power source in response to the detection of an internal fault in the transformer. The system includes circuitry for generating first and second current signals each having a phase and magnitude which is a function of the phase and magnitude of phased currents in a first winding and a second winding of the transformer and a circuit for scaling the magnitude of the first and second current signals. The system further includes a circuit for shifting the phase of the scaled second current signal to match the phase of the scaled first current signal, a circuit for detecting a difference between the magnitude of the scaled first current signal and the magnitude of the scaled phase shifted second current signal and for producing an output when the detected difference exceeds a predetermined amount, and a circuit for activating the circuit breaker in response to the reception of the output.

Also in general, another form of the present invention involves an apparatus for monitoring phased currents in a first winding and a second winding of a transformer and for disconnecting the transformer from a power source supplying the transformer when a difference between the magnitude of the current in the first winding and the magnitude of the current in the second winding indicates a fault. The apparatus includes circuitry for generating first and second current signals each having a phase and magnitude which is a function of the phase and magnitude of the phased currents in the first and second windings respectively and a circuit having a variable resistance for scaling the magnitude of the first current signal in accordance with a scaling factor. The apparatus further includes a circuit for detecting a difference between the magnitude of the scaled first current signal and the magnitude of the second current signal and a circuit for disconnecting the transformer from the power source when the detected difference indicates a fault.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
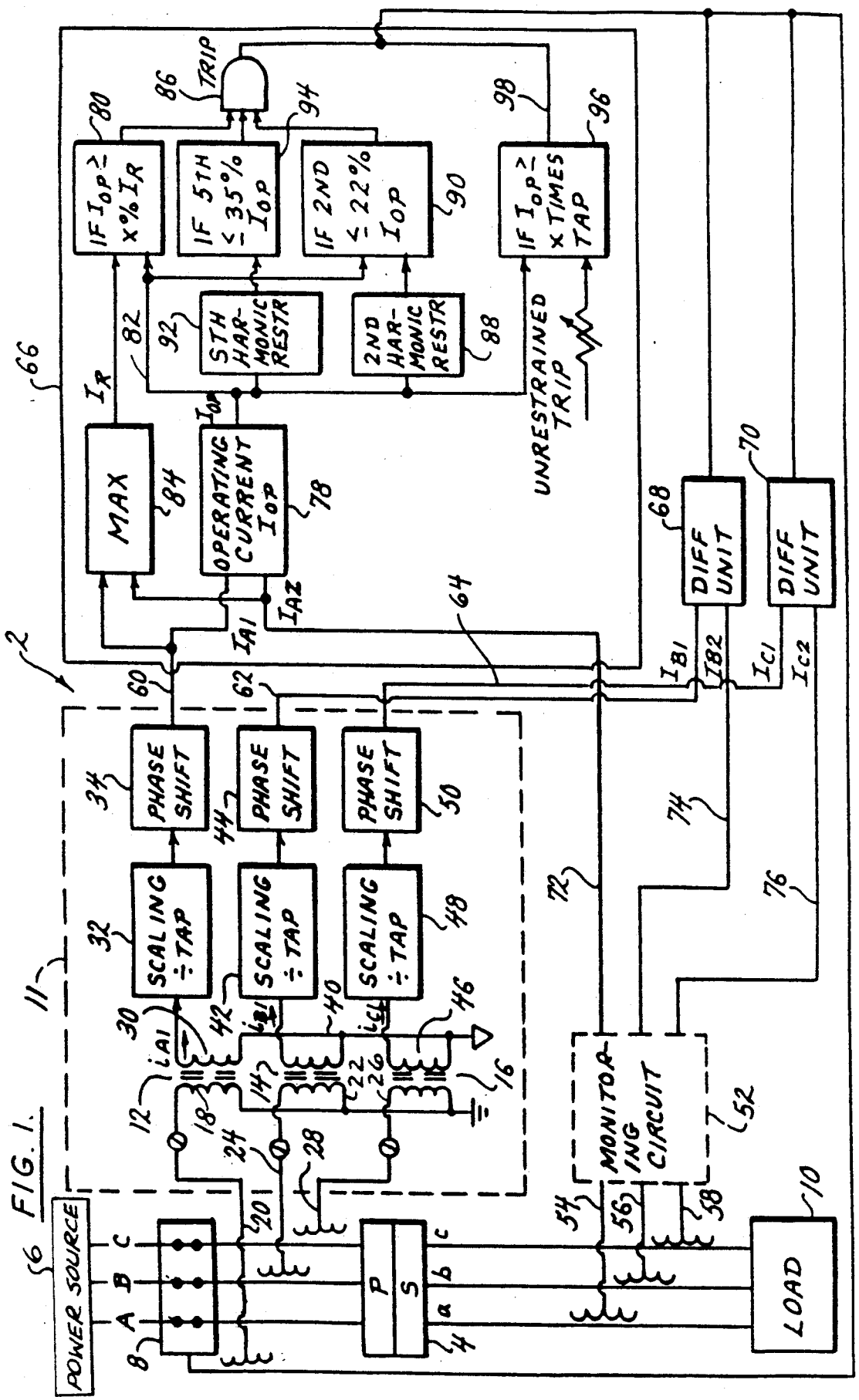
FIG. 1 is a block diagram of a transformer differential relay of the present invention for protecting a three-phase transformer.

Referring now to the drawings, and more particularly to FIG. 1, there is illustrated a block diagram of a transformer differential relay constructed in accordance with the principles of the present invention indicated generally as 2. Relay 2 monitors the currents in each of the phases of a primary winding and a secondary winding of a transformer 4. The primary side of transformer 4 is connected to a three-phase power source having phases A, B, and C via circuit breaker 8. Circuit breaker 8 is an example of disconnect means. The secondary side of transformer 4 is connected to a load circuit 10.

In general, relay 2 monitors currents in the transformer 4 in each of three phases A, B, C of a first (primary) winding P and currents in each of three corresponding phases a, b, c of a second (secondary) S winding coupled to the first winding. Relay 2 actuates the circuit breaker 8 for disconnecting the transformer 4 from the three-phase power source supplying the transformer 4. Relay 2 actuates breaker 8 when a difference between the magnitude of the current in any of the phases A, B, C of the first winding P and the magnitude of the current in any one of the corresponding phases a, b, c, respectively, of the second winding S exceeds a predetermined amount indicative of a fault condition. Circuit 11 and circuit 52, which is the same as circuit 11, each include input current transformers 12, 14, and 16 which are connected to each phase A, B, C, of the first winding and each phase a, b, c of the second winding of transformer 4, respectively. Input current transformers 12, 14, and 16 are an example of means for generating at least one first current signal and at least one second current signal. Each current signal corresponds to one of the currents in one of the phases of the first and second windings, respectively. Each current signal has a phase angle which is a function of the phase angle of its corresponding current and has a magnitude which is a function of the magnitude of its corresponding current.

Input transformer 12 has a primary winding connected to phase A of the first winding P by a line 20. Additionally, input transformer 14 has a primary winding connected to phase B of the first winding P by a line 24 and input transformer 16 has a primary winding connected to phase C of the first winding P by a line 28. An input current $i_{A1}$ for phase A is supplied from a secondary winding 30 of the input current transformer 12 to a scaling unit 32 which scales the input current $i_{A1}$. The scaled current signal is supplied as an input to a phase-shift unit 34. The phase-shift unit 34 shifts the phase of the scaled current signal to compensate for any phase-shift which may occur between the primary and secondary windings of the transformer 4 being connected in a wye/delta or delta/wye configuration and thereby generate $I_{A1}$.

Figure 2A:
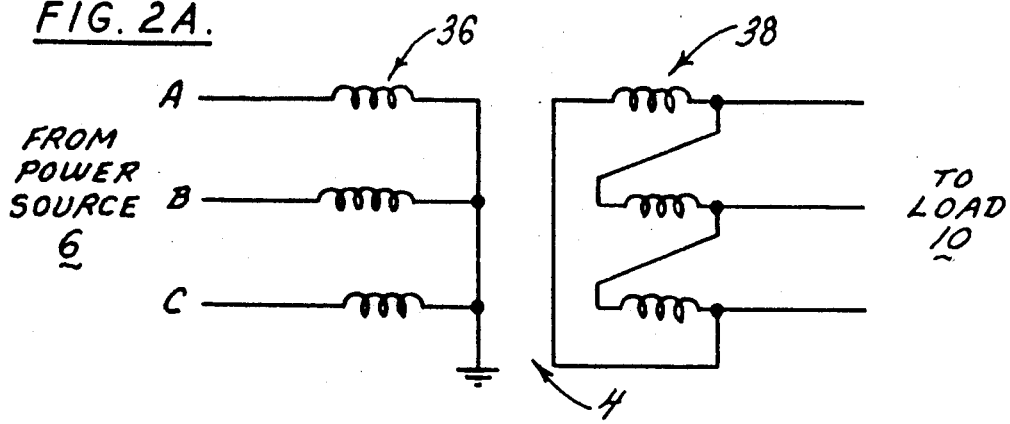
FIG. 2A is a schematic diagram of a transformer as shown in FIG. 1 connected in a wye/delta configuration.
Figure 2B:
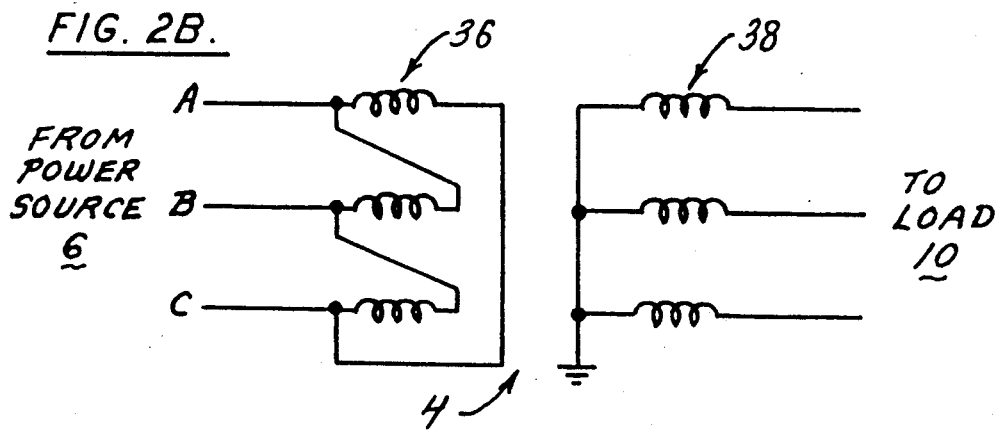
FIG. 2B is a schematic diagram of a transformer as shown in FIG. 1 connected in a delta/wye configuration.

For example, as shown in FIG. 2A when the transformer 4 has its primary windings 36 in a wye configuration and its secondary windings 38 in a delta configuration, the current in the secondary windings 38 lags the current in the primary windings 36 by 30°. Alternatively, if the primary windings 36 are connected in a delta/wye configuration and the secondary windings 38 connected in a wye configuration as shown in FIG. 2B, the current in the secondary windings 38 lags the current in the primary windings 36 by 30°.

Referring again to FIG. 1, an input current $i_{B1}$ for phase B is supplied from a secondary winding 40 of the input current transformer 14 to a scaling unit 42 which scales the input current $i_{B1}$. The scaled current signal is supplied as an input to a phase-shift unit 44, which is the same circuit as phase-shift unit 34, to shift the phase of the scaled current signal to compensate for any primary/secondary phase shift and thereby generate current $I_{B1}$. Additionally, an input current $i_{C1}$ for phase C is supplied from a secondary winding 46 of the input current transformer 16 to a scaling unit 48 which scales the input current $i_{C1}$. The scaled current signal is supplied as an input to a phase-shift unit 50 to shift its phase to compensate for any primary/secondary phase shift to generate $I_{C1}$.

Circuit 52, which is identical in construction with circuit 11, is connected to each phase a, b, c of the second winding S of transformer 4 by lines 54, 56, and 58, respectively, for monitoring current flowing out of the second windings. Circuit 52 also includes input transformers (not shown) for developing current signals $I_{A2}$, $I_{B2}$, and $I_{C2}$, each corresponding to current in each phase a, b, c, respectively of the second winding S.

The outputs of the phase-shift units 34, 44 and 50 are supplied by lines 60, 62, and 64 to differential units 66, 68 and 70, respectively. Also, the outputs of the phase-shift units (not shown) of circuit 52 are supplied by lines 72, 74, and 76 to differential units 66, 68, and 70, respectively. For example, the phase A currents $I_{A1}$ and $I_{A2}$ representing the phase A currents monitored in the first and second windings are supplied to differential unit 66. Since each differential unit for each phase is similar to the other differential units, it is sufficient to describe a differential unit for one of the phases, for example phase A.

Differential unit 66 includes an operating current unit 78 having as its inputs the outputs of the phase-shift units supplied by lines 60 and 72. The operating current unit 78 detects a difference between the magnitude of currents $I_{A1}$ and $I_{A2}$ and generates an operating current ($I_{OP}$) representative thereof. Ideally, $I_{OP}$ should be zero if there is no internal fault in the transformer 4. However, current transformer errors may cause some $I_{OP}$ to flow. To reduce the sensitivity of the relay 2 to compensate for any current transformer errors which may cause an erroneous $I_{OP}$ to flow, an output signal of the operating current unit 78 is provided to an input to a through current restraint unit 80. A maximum current unit 84 determines the larger of $I_{A1}$ and $I_{A2}$ and generates a restraint current ($I_R$) which is the larger of the two currents. $I_R$ is provided as a second input to the through current restraint unit 80. The through current restraint unit 80 compares $I_{OP}$ against a predetermined percentage of $I_R$. This predetermined percentage is selected to disregard relatively small operating currents $I_{OP}$ which may flow due to mismatch and current transformer errors. An example of an appropriate range of percentages which will operate the through current restraint unit 80 is 10%–55% of $I_R$. If $I_{OP}$ is equal to or greater than the predetermined percentage of $I_R$, unit 80 will provide a disable signal to one of the inputs of AND gate 86. If the other two inputs of AND gate 86 receive disable signals, as described below, AND gate 86 will operate the circuit breaker 8 by providing a trip signal to it to disconnect the transformer 4 from the power source 6.

In order to restrain or prevent the differential unit 60 from tripping the circuit breaker 8 during inrush current, a second harmonic restraint unit 88 detects a second harmonic component of $I_{OP}$. The second harmonic component of $I_{OP}$ is provided to a second harmonic comparison unit 90 which compares the second harmonic component of $I_{OP}$ to a predetermined percentage of $I_{OP}$. If the second harmonic component of $I_{OP}$ exceeds the predetermined percentage of $I_{OP}$, such as 22%, for example, then the second harmonic comparison unit 90 will provide a disable signal to AND gate 86 to prevent the circuit breaker 8 from receiving a trip signal.

Additionally, in order to restrain or prevent tripping of the circuit breaker 8 by the differential unit 66 during overexcitation of the transformer 4, a fifth harmonic restraint unit 92 detects a fifth harmonic component of $I_{OP}$. The fifth harmonic component of $I_{OP}$ is provided to a fifth harmonic comparison unit 94 which compares the fifth harmonic component of $I_{OP}$ to a predetermined percentage of $I_{OP}$. If the fifth harmonic component of $I_{OP}$ exceeds the predetermined percentage of $I_{OP}$, such as 35%, for example, then the fifth harmonic comparison unit 94 will provide a disable signal to AND gate 86 to prevent the circuit breaker 8 from receiving a trip signal.

Thus, the AND gate 86 will operate the circuit breaker 8 only when $I_{OP}$ is greater than or equal to a predetermined percentage of $I_R$, the second harmonic component of $I_{OP}$ is less than or equal to a predetermined percentage of $I_{OP}$, and the fifth harmonic component of $I_{OP}$ is less than or equal to a predetermined percentage of $I_{OP}$. In this event units 80, 90 and 94 provide disable signals to AND gate 86, it in turn, provides a trip signal to breaker 8 to disconnect transformer 4 from the power source.

The differential unit 66 also includes an unrestrained trip unit 96 for generating an unrestrained output over a line 98 for operating the circuit breaker 8 in case a severe internal fault has a second harmonic component which inhibits or delays the AND gate 86 from operating the circuit breaker 8. The unrestrained trip unit 96 compares $I_{OP}$ against a predetermined value, such as a multiple of a scaled factor on a per input basis. When $I_{OP}$ exceeds the predetermined value the circuit breaker 8 will receive a trip signal from unit 96 regardless of the output of the AND gate 86. An example of a suitable range of multiples of the scaled factor which will operate the unrestrained trip unit 96 is 6 to 20.

Figure 3:
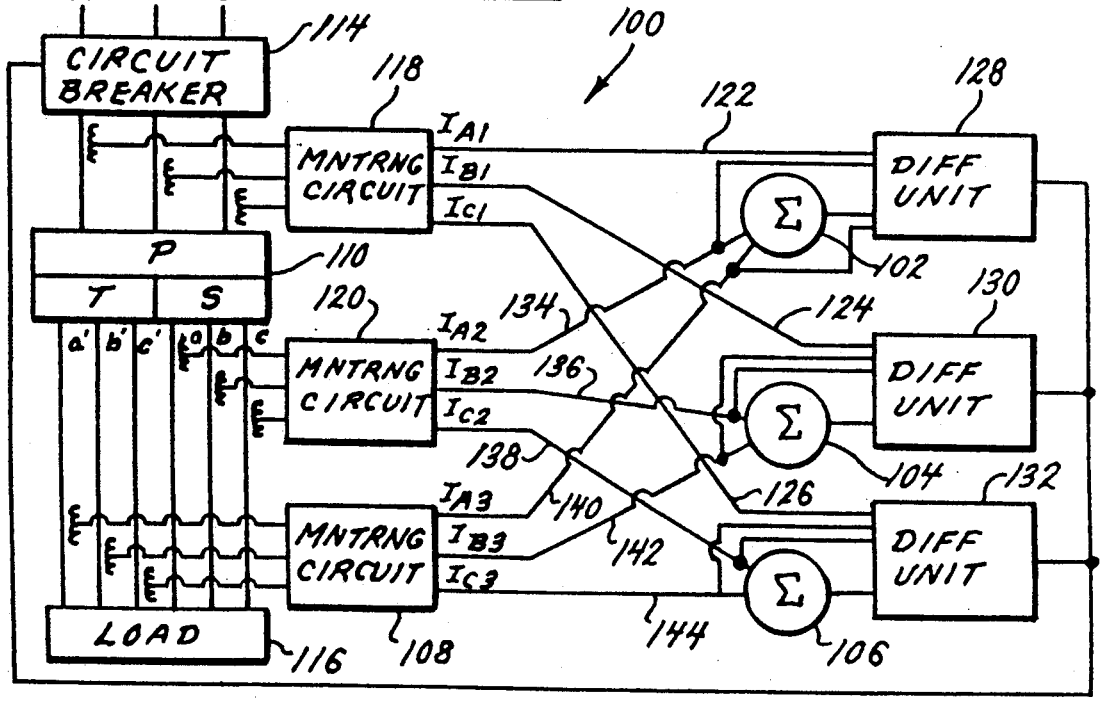
FIG. 3 is a block diagram of the transformer differential relay of FIG. 1 including a third (tertiary) input from the secondary.

FIG. 3 illustrates a relay 100 similar to relay 2 shown in FIG. 1 except the relay 100 further includes summing junctions 102, 104, and 106 and a circuit 108 connected to a third (tertiary) winding T of the transformer 110. More specifically, in this embodiment of the invention the relay 100 monitors the currents in each of the phases of a first winding P, a second winding S, and a third winding T of the transformer 110. The third winding T may be coupled to either the first winding or the second winding. In the example of FIG. 3, third winding T is coupled to the primary winding P. The primary side of transformer 110 is connected to a three-phase power source 112 having phases A, B, and C via circuit breaker 114. The secondary and tertiary sides of transformer 110 are connected to a load circuit 116. Circuit 108 is identical in construction to circuits 11 and 52 shown in FIG. 1. If third winding T is coupled to the secondary winding S, it would then be connected to power source 112 or some other power source.

Circuits 118 and 120 are identical in construction to circuit 108. Circuits 108, 118, and 120 include input transformers (not shown) for generating at least one first current signal, at least one second current signal, and at least one third current signal. Each current signal corresponds to one of the currents in one of the phases of the first, second, and third windings. Each current signal has a phase angle which is a function of the phase angle of its corresponding current and has a magnitude which is a function of the magnitude of its corresponding current.

The outputs of circuit 118, which are $I_{A1}$, $I_{B1}$, and $I_{C1}$, are supplied by lines 122, 124, and 126 to differential units 128, 130, and 132, respectively. Differential units 128, 130, and 132 are identical in construction to differential units 66, 68, and 70 of FIG. 1. The outputs of circuit 120, which are $I_{A2}$, $I_{B2}$, and $I_{C2}$, are supplied by lines 134, 136, and 138 to summing junctions 102, 104, and 106, respectively. Also, the outputs of circuit 108, which are $I_{A3}$, $I_{B3}$, and $I_{C3}$, are supplied by lines 140, 142, and 144 to summing junctions 102, 104, and 106, respectively.

Summing junction 102 sums currents $I_{A2}$ and $I_{A3}$ and provides this resulting total of the representative secondary and tertiary current signals to an input of differential unit 128. In a similar manner, summing junction 104 sums currents $I_{B2}$ and $I_{B3}$ and provides this result to an input of differential unit 130. Also, the result of the summation of currents $I_{C2}$ and $I_{C3}$ is provided to an input of differential unit 132.

The differential units 128, 130, and 132 operate similar to differential units 66, 68, and 70. Circuit breaker 114 will be tripped when any of the differential units 128, 130, or 132 determines that $I_{OP}$ is greater than or equal to a predetermined percentage of $I_R$, and when the second harmonic component of $I_{OP}$ is less than or equal to a predetermined percentage of $I_{OP}$, and the fifth harmonic component of $I_{OP}$ is less than or equal to a predetermined percentage of $I_{OP}$. For primary phase A and corresponding secondary phases a and a', $I_{OP}$ equals the difference of $I_{A1}$ and the sum of $I_{A2}$ and $I_{A3}$ and $I_R$ equals the maximum of $I_{A1}$, $I_{A2}$, and $I_{A3}$. Similarly, for phases B, b, b', $I_{OP} = I_{B1} - (I_{B2} + I_{B3})$ and $I_R = $ max $(I_{B1}, I_{B2}, I_{B3})$ and for phases C, c, c', $I_{OP} = I_{c1} - (I_{c2} + I_{c3})$ and $I_R = $ max $(I_{c1}, I_{c2}, I_{c3})$.

Figure 4:
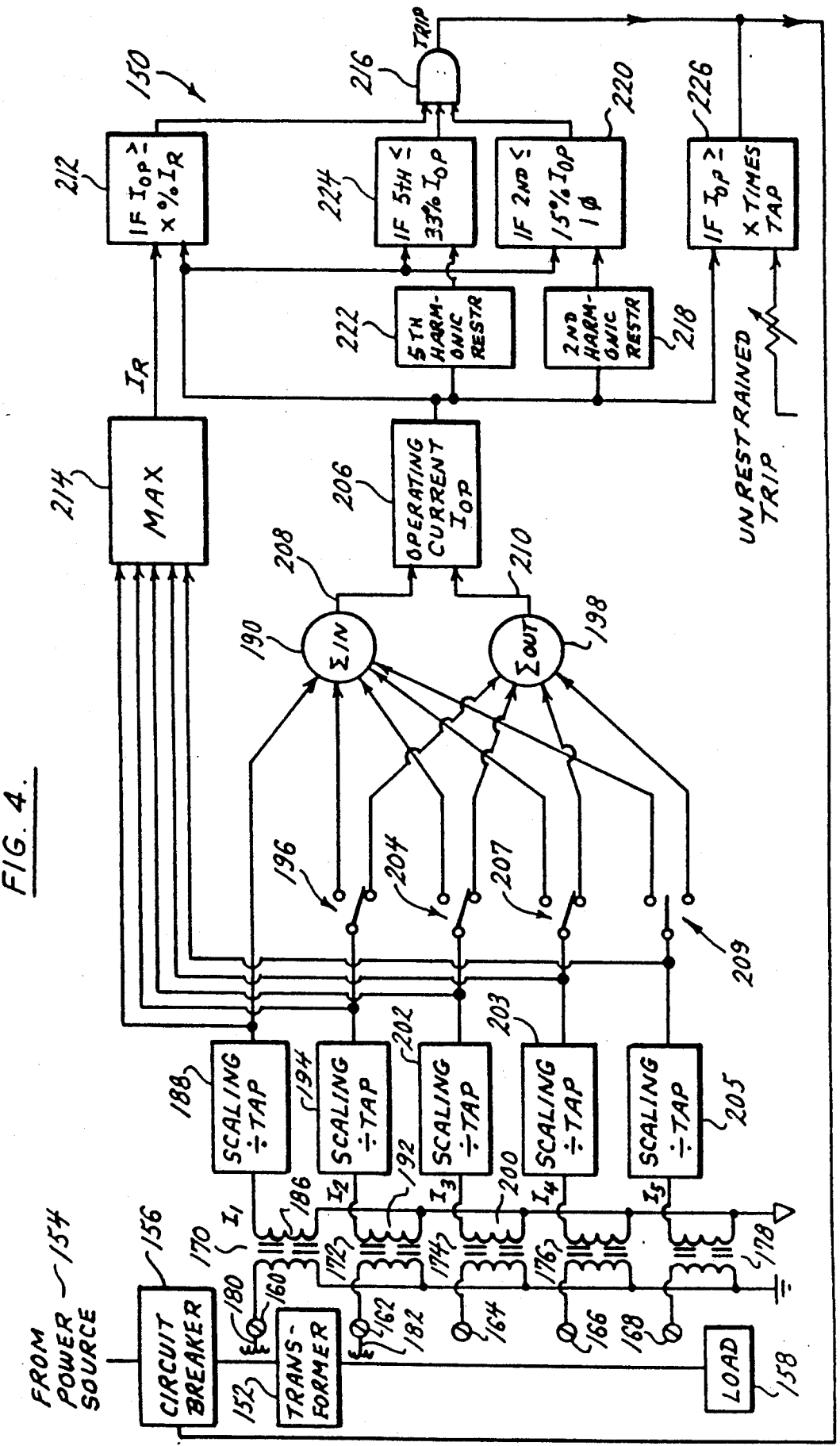
FIG. 4 is a block diagram of a transformer differential relay of the present invention for protecting a single-phase transformer.

In FIG. 4 a block diagram of a relay 150 for monitoring single-phased currents in a first winding and a second winding of a transformer 152 is illustrated. The primary side of the transformer 152 is connected to a single-phase power source 154 via circuit breaker 156. The secondary side is connected to a load circuit 158. Relay 150 includes five inputs 160, 162, 164, 166, and 168 connected to five input current transformers 160, 162, 164, 166, and 168 for monitoring currents in either the first winding or the second winding of the transformer 152. For example, input 160 is connected by a line 180 to the first winding of transformer 152 and input 162 is connected by line 182, to the second winding of the transformer 152. Inputs 164, 166 and 168 are not connected to either of the windings in this example. However, if required inputs 164, 166 or 168 may be connected to additional windings, if for example transformer 152 has five windings. Multiple inputs are preferred and sometimes required because transformers often have a significant portion of the total current in a third winding. Multiple inputs allow the relay to monitor current in the third winding. If the transformer has a third winding one of the inputs 164, 166 or 168 may be used to monitor current in the third winding.

A current signal $I_I$ is supplied from a secondary winding 186 of the input current transformer 170 to a scaling unit 188 which scales $I_I$. The scaled current signal of $I_I$ is supplied directly to a summing junction 190. A current signal $I_2$ is supplied from a secondary winding 192 of the input current transformer 172 to a scaling unit 194 which scales $I_2$. The scaled current signal of $I_2$ is supplied to a switch 196 which directs the current signal to either summing junction 190 or a summing junction 198. $I_2$ is directed to summing junction 190 when the input transformer 172 is monitoring current flowing into the first winding of the transformer 152. Conversely, $I_2$ is directed to summing junction 198 when the input transformer 172 is monitoring current flowing out of the second winding of the transformer 152. Summing junction 190 sums all of the scaled currents representing currents into the transformer 152 and summing junction 198 sums all of the scaled currents representing currents out of the transformer 152. If additional windings are to be monitored the current signals developed by transformers 174, 176, and 178 and scaled by scaling units 202, 203, and 205 may be directed to either summing junctions 190 or 198 by switches 204, 207, and 209, respectively. Ideally, $I_I$ is proportional to $I_2$ so that $I_I$ and $I_2$ must be scaled accordingly.

The output of summing junction 190 is supplied as an input to an operating current unit 206 via line 208. An output of summing junction 198 is supplied as another input to the operating current unit 206 via line 210. The operating current unit 206 detects a difference between the scaled sums of currents monitored in the first and second windings of the transformer 152 to generate an operating current ($I_{OP}$). Ideally, $I_{OP}$ should be zero if there is no internal fault in the transformer. However, current transformers errors may cause some $I_{OP}$ to flow. To reduce the sensitivity of the relay 150 to compensate for any current transformer errors which may cause an erroneous $I_{OP}$ to flow, an output signal of the operating current unit 206 is sent as an input to a through current restraint unit 212. A maximum current unit 214 has as its inputs all of the scaled currents. The maximum current unit 214 determines the largest of all of the scaled currents and generates a restraint current ($I_R$) which is the largest of the scaled currents. $I_R$ is provided as a second input of the through current restraint unit 212. The through current restraint unit 212 compares $I_{OP}$ against a predetermined percentage of $I_R$. This predetermined percentage is selected to compensate for current transformer mismatch. An example of an appropriate range of percentages for through current restraint unit 212 is 10%–55% of $I_R$. If $I_{OP}$ is equal to or greater than the predetermined percentage of $I_R$, through current restraint unit 212 will provide a trip signal to AND gate 216. If the other two inputs of AND gate 86 receive enable signals, as described below, AND gate 86 will operate the circuit breaker 156 by providing a trip signal to it to disconnect the transformer from the power source 154.

In order to restrain or prevent the relay 150 from tripping the circuit breaker 156 during current inrush a second harmonic restraint unit 218 detects a second harmonic component of $I_{OP}$. The second harmonic component is provided to a second harmonic comparison unit 220 which compares the second harmonic component of $I_{OP}$ to a predetermined percentage of $I_{OP}$. If the second harmonic component of $I_{OP}$ exceeds the predetermined percentage of $I_{OP}$, such as 15%, for example, then the harmonic comparison unit 220 will provide a disable signal to AND gate 86 to prevent the circuit breaker 150 from receiving a trip signal.

Additionally, in order to restrain or prevent the relay 150 from tripping the circuit breaker 156 during overexcitation of the transformer 152 a fifth harmonic restraint unit 222 detects a fifth harmonic component of $I_{OP}$. The fifth harmonic component of $I_{OP}$ is provided to a fifth harmonic comparison unit 224 which compares the fifth harmonic component of $I_{OP}$ to a predetermined percentage of $I_{OP}$. If the fifth harmonic component of $I_{OP}$ exceeds the predetermined percentage of $I_{OP}$, such as 35%, for example, then the harmonic comparison unit 224 will provide a disable signal to AND gate 86 to prevent the circuit breaker 156 from receiving a trip signal.

Thus, the AND gate 216 will operate the circuit breaker 156 only when $I_{OP}$ is greater than or equal to a predetermined percentage of $I_R$, the second harmonic component of $I_{OP}$ is less than or equal to 15% of $I_{OP}$, and the fifth harmonic component of $I_{OP}$ is less than or equal to 35% of $I_{OP}$.

The relay 150 also includes an unrestrained trip unit 226 for generating an unrestrained output for operating the circuit breaker 156 in case a severe internal fault has a second harmonic component which inhibits or delays the AND gate 216 from operating the circuit breaker 156. The unrestrained trip unit 226 compares $I_{OP}$ against a predetermined value, such as a multiple of a scaled factor on a per input basis. When $I_{OP}$ exceeds the predetermined value the circuit breaker 156 will receive a trip signal regardless of the output of the AND gate 216. An example of a suitable range of multiples of the scaled factor which will operate the unrestrained trip unit 226 is 6 to 20.

Figure 5A:
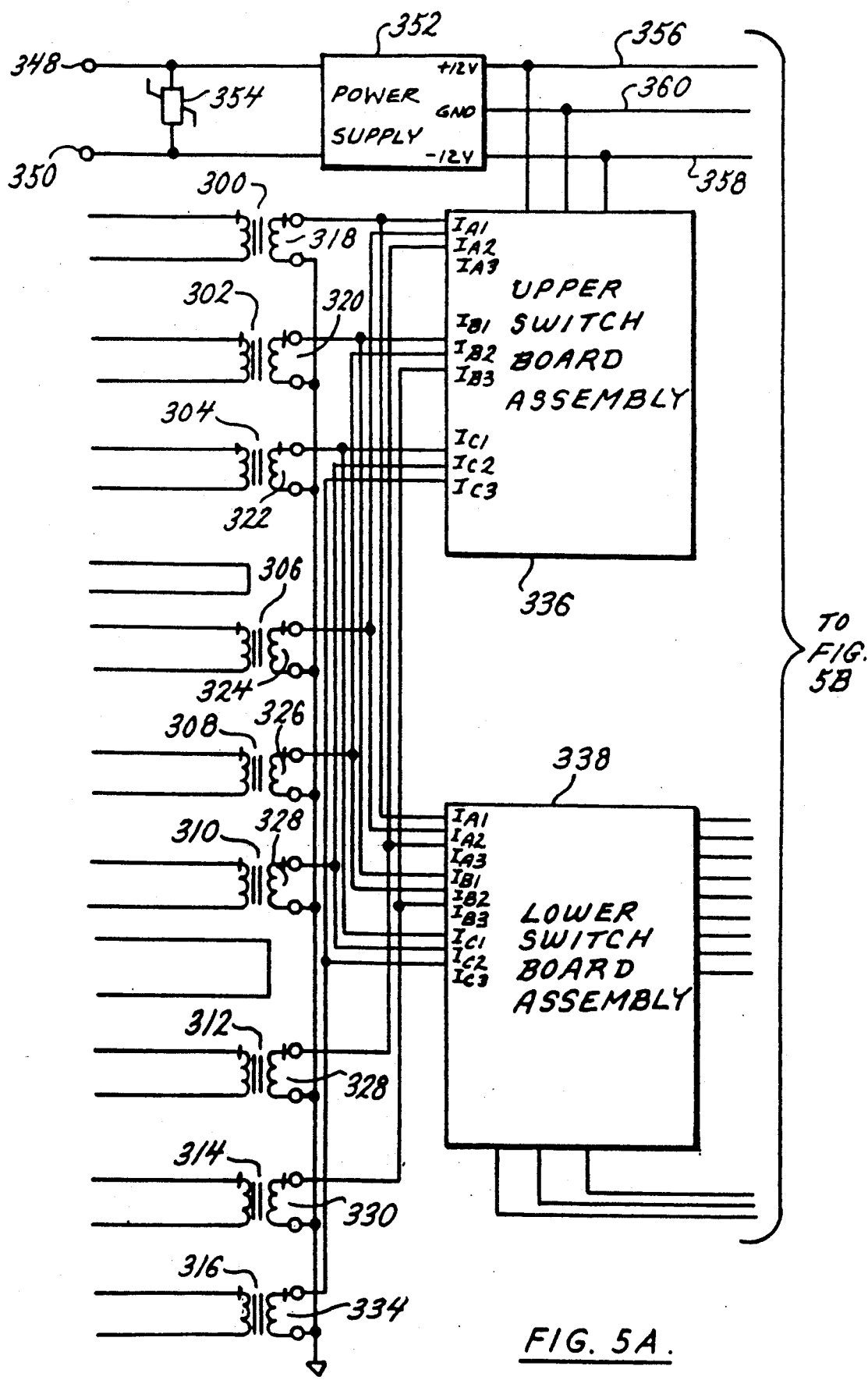
FIGS. 5A and 5B are schematic diagrams of the transformer differential relay of FIG. 3 including an upper switch board assembly, a lower switch board assembly, a phase-shifting analog board, and three multifunction analog boards.
Figure 5B:
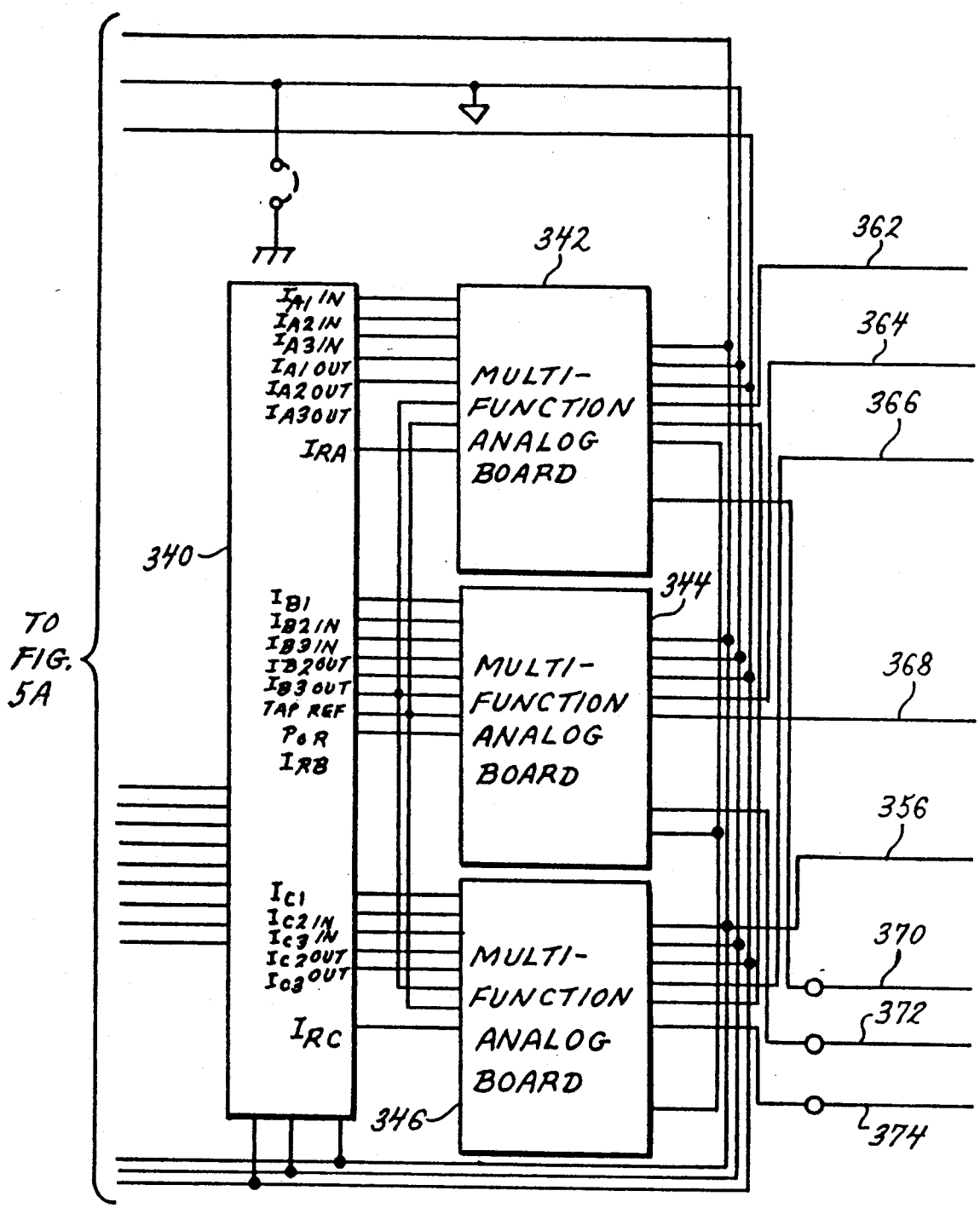

Referring to FIGS. 5A and 5B, there is shown a detailed schematic of the transformer differential relay 100 of FIG. 3. Nine input transformers 300–316 monitor currents in transformer 110 in each of three phases of the first second, and third windings. Nine secondary windings 318–334 of the current transformers provide the current signals representative of each of the currents in each phase of each winding to an upper switch board assembly 336 and a lower switch board assembly 338 connected in parallel with upper switch board assembly 336. Upper switch board assembly 336 and lower switch board assembly 338 include the scaling units for scaling the current signals. The scaled current signals are supplied from the lower switch board assembly 338 to a phase-shifting analog board 340 (FIG. 5B) which includes the phase-shifting units for shifting the phase of the scaled current signals. Phase-shifting analog board 340 also includes circuitry for generating a tap reference (TAP REF) signal, a power on reference (POR) signal, and through current restraint signals $I_{RA}$, $I_{RB}$, and $I_{RC}$ for all three phases. The outputs of phase-shifting analog board 340 are provided to three multifunction analog boards 342, 344, and 346. Multifunction analog boards 342, 344, and 346 include the summing junctions 102, 104, and 106, the second and fifth harmonic restraint units, the second and fifth harmonic comparison units, and the AND gate.

External operating power is supplied to terminals 348 and 350 of relay 100 then to a power supply board 352. A varistor 354 provides surge protection for the power supply board 352 by suppressing voltages above 275 volts. The power supply board 352 provides power to internal circuitry by lines 356 and 358. A ground connection is included in the power supply board 352 and provided to internal circuitry by a line 360.

The multifunction analog boards 342, 344, and 346 each include an output 362, 364, and 366 connected to the circuit breaker 114 for operating circuit breaker 114. Output 368 operates circuit breaker 114 regardless of the outputs 362, 364, and 366. Additionally, outputs 370, 372, and 374 are supplied to indicators (not shown) for indicating which of the phases operated circuit breaker 114.

Figure 6:
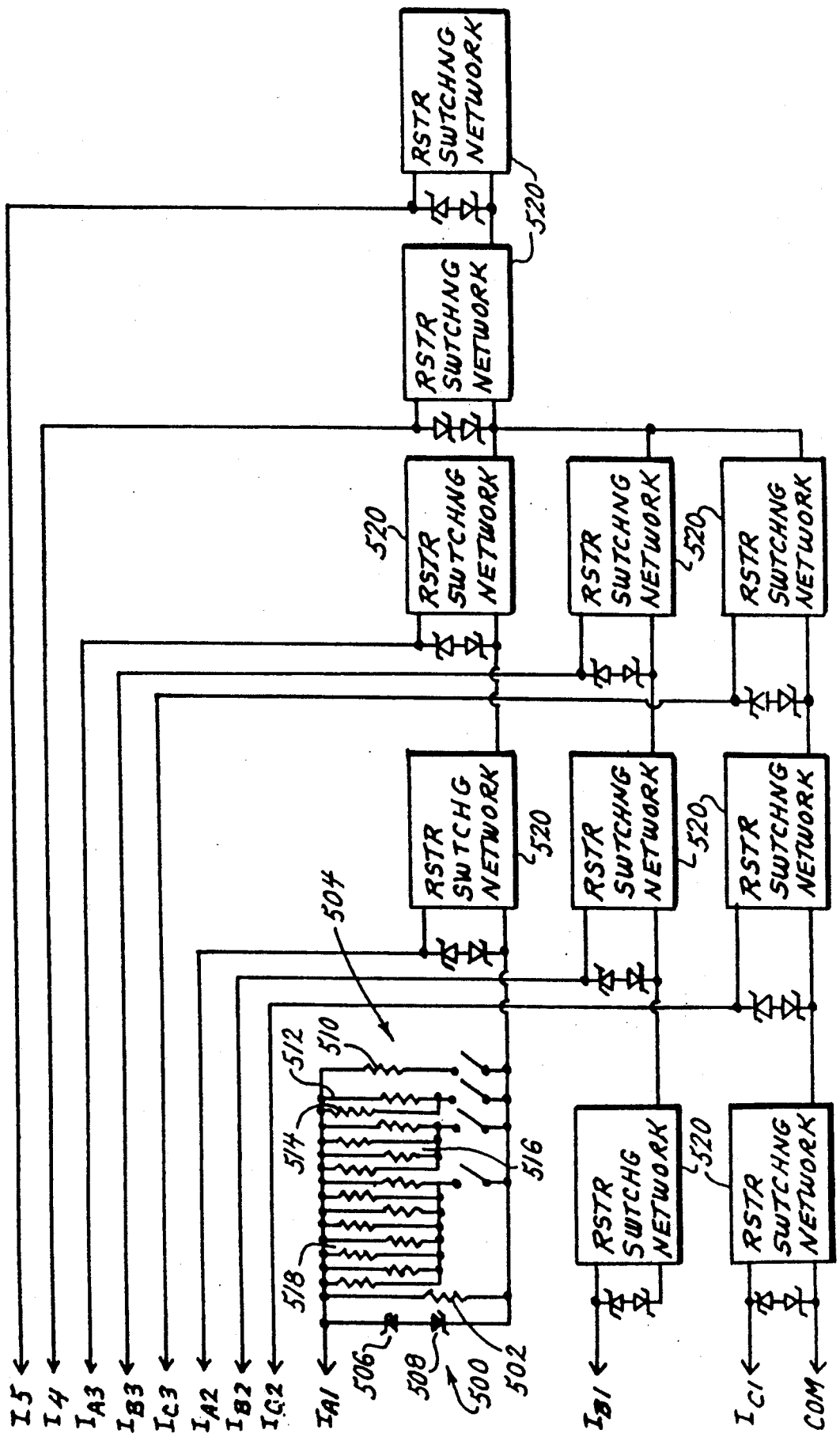
FIG. 6 is a schematic diagram of the upper switch assembly board of FIG. 5A.

Referring now to FIG. 6, a schematic diagram of the upper switch board assembly 336 is shown. A resistor switching network 500 for scaling current signal $I_{A1}$ of phase A comprises a fixed resistor 502 and a binary coded decimal (BCD) switch 504 having variable resistor values connected in parallel with the fixed resistor 502. A pair of zener diodes 506 and 508 are connected in parallel with the fixed resistor 502 to protect the resistor switching network 500. Resistor 510 when switched in has a BCD weight of one, resistors 512 and 514 when switched in have a BCD weight of two, resistors 516 when switched in have a BCD weight of four, and resistors 518 when switched in have a BCD weight of eight. The upper switch board assembly 336 scales the input currents by an integer value. Other resistor switching networks 520 scale the other input currents and are shown generally in block diagram form in FIG. 6. Resistor switching networks 520 structure are identical to resistor switching network 500. The BCD switch 504 is connected to a rotary switch (not shown) which is located on a front panel (not shown) of the relay 100. The integer values that appear on the rotary switch are in increments of units ranging from 2 to 8.

Figure 7:
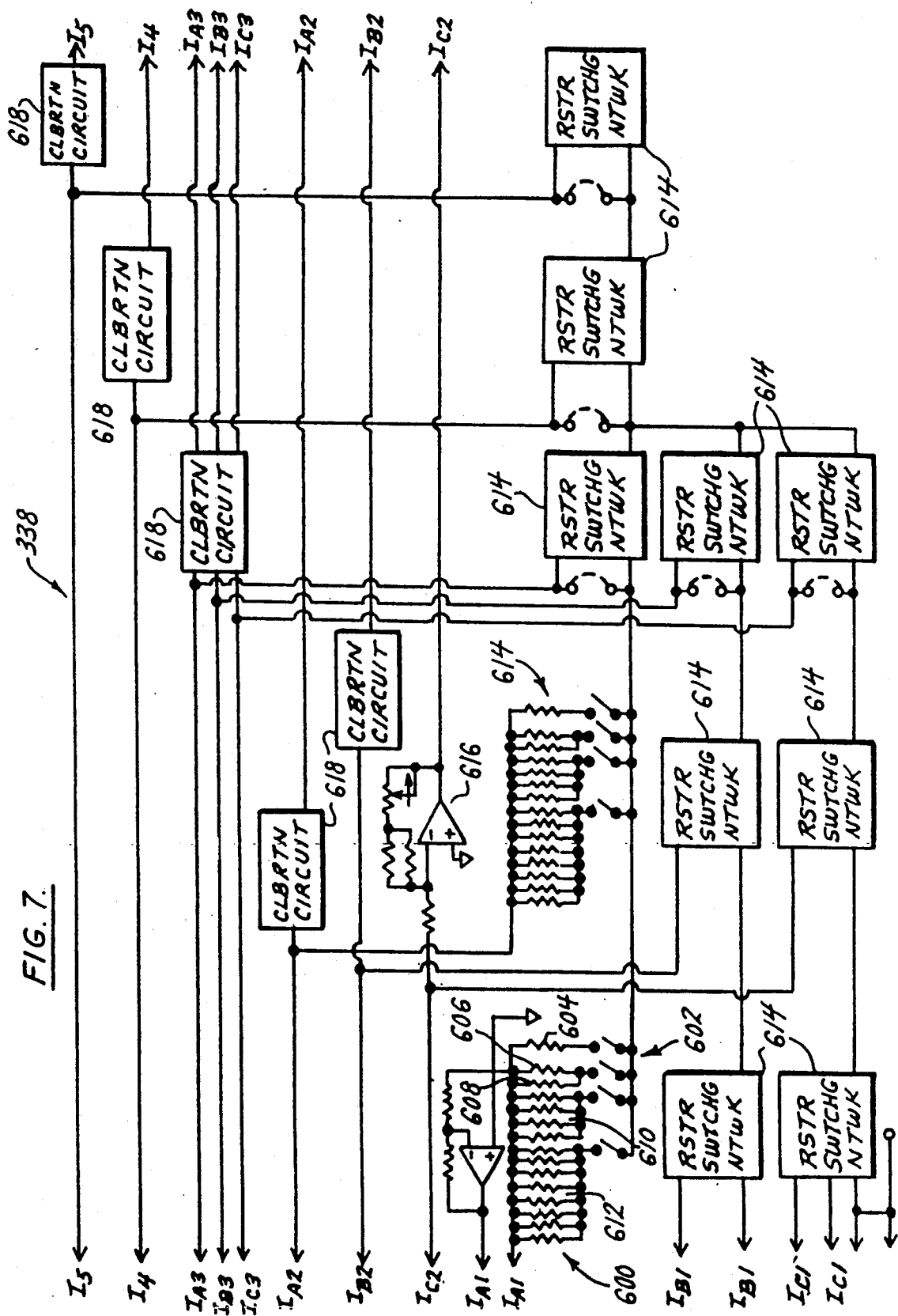
FIG. 7 is a schematic diagram of the lower switch assembly board of FIG 5A.

In FIG. 7, a schematic diagram of the lower switch board assembly 338 is shown. A resistor switching network 600 for scaling input current of phase A comprises a BCD switch 602 having variable resistor values. Resistor 604 when switched in has a BCD weight of one, resistors 606 and 608 when switched in have a BCD weight of two, resistors 610 when switched in have a BCD weight of four, and resistors 612 when switched in have a BCD weight of eight. The lower switch board assembly 338 scales the input currents by an value. Other resistor switching networks 614 scale the other currents and are shown generally in block diagram form in FIG. 7. Resistor switching networks 614 structure are identical to resistor switching network 600. The BCD switch 602 is connected to a second rotary switch (not shown) which is located on the front panel of the relay 100. The values that appear on the rotary switch are in increments of tenths of a unit ranging in value from 0.0 to 0.9.

The upper switch board assembly 336 and the lower switch board assembly 338 constitute an example of means for scaling the magnitude of the first current signal of one phase in accordance with a scaling factor.

Additionally, the lower switch board assembly 338 includes a calibration circuit 616 for calibrating the currents. Other calibration circuits 618 calibrate other currents and are shown in block diagram form in FIG. 7.

Figure 8A:
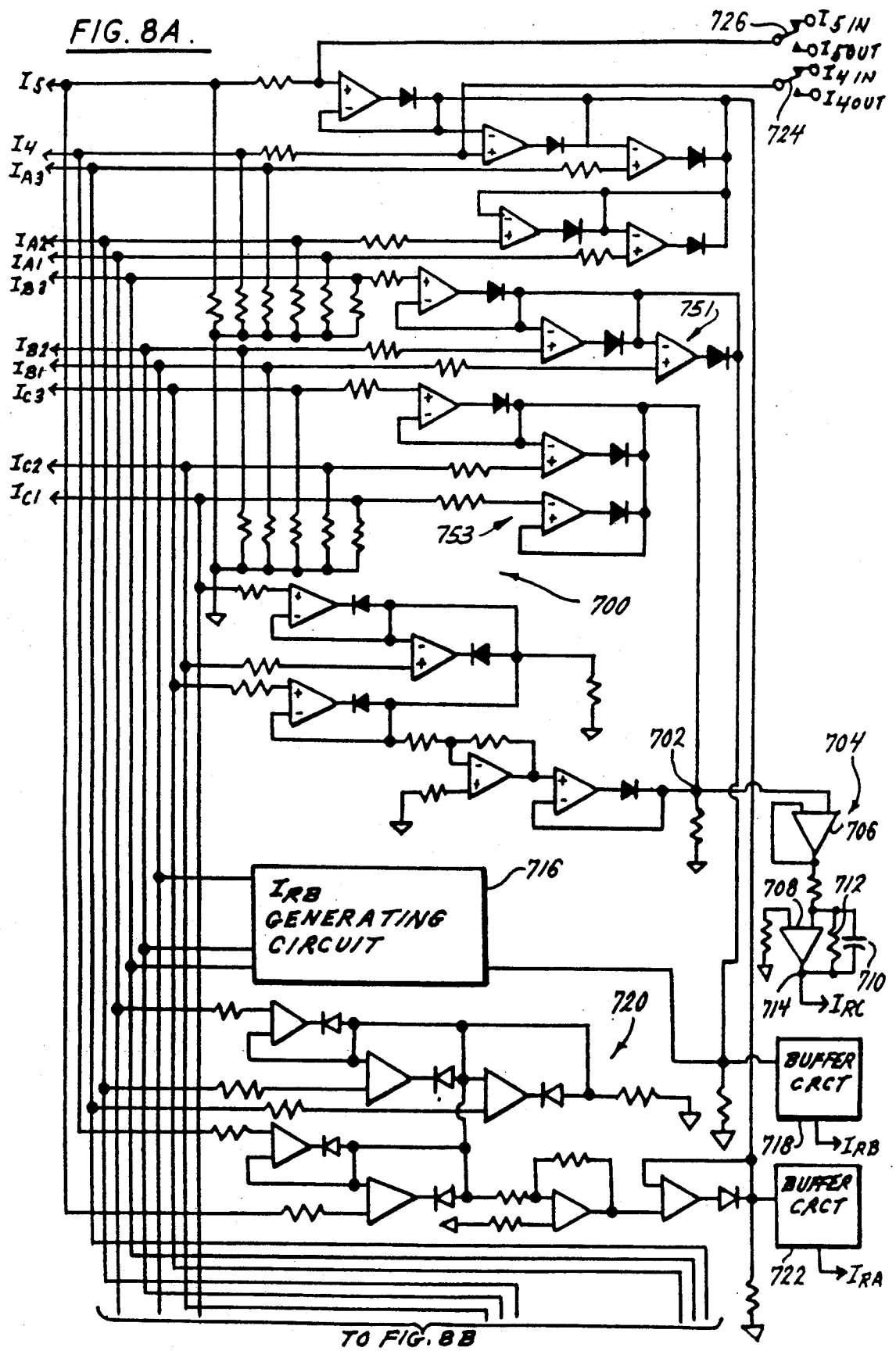
FIGS. 8A and 8B are schematic diagrams of the phase-shifting analog board of FIG. 5B.
Figure 8B:
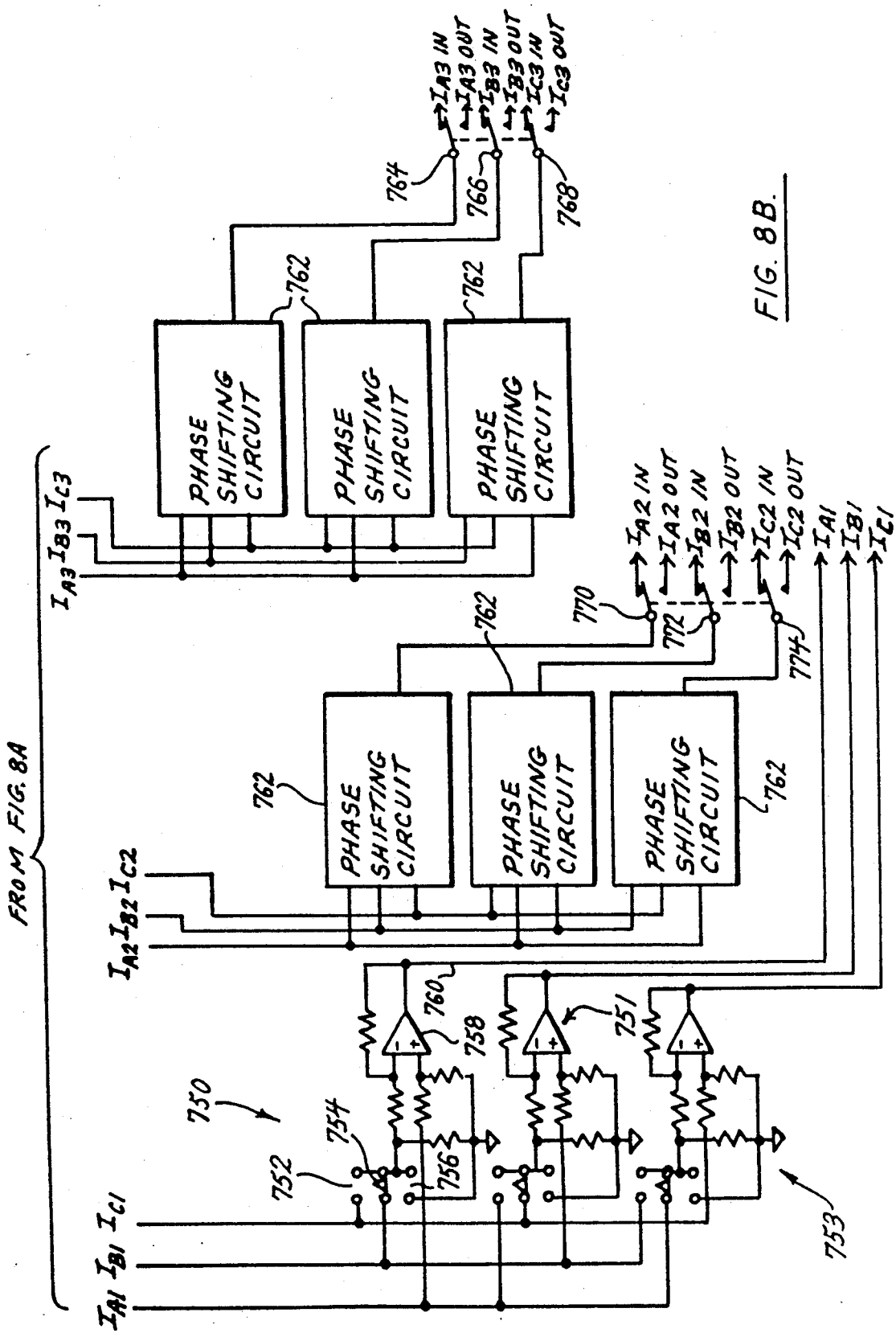

Referring now to FIGS. 8A and 8B, the phase-shifting analog board 340 is illustrated. There is one phase-shifting analog board 340 per relay 100. Relay 150 also includes only one phase-shifting analog board 340. FIG. 8A shows an upper portion of the board 340 which includes circuitry for generating through current restraint signals $I_{RA}$, $I_{RB}$, and $I_{RC}$ for each phase. Through current restraint signal $I_{RC}$ is generated by circuit 700 by comparing current signals $I_{C1}$, $I_{C2}$, and $I_{C3}$ to determine which one is the largest. The output of circuit 700 is produced at node 702 and supplied to a circuit 704 which includes an operational amplifier (op amp) 706 for buffering the signal, op amp 708, capacitor 710, and a resistor 712 for integrating the signal to a lower frequency to generate $I_{RC}$ at node 714. Circuit 716 is similar in construction to circuit 700 and generates $I_{RB}$ by comparing $I_{B1}$, $I_{B2}$, and $I_{B3}$. Also, circuit 718, which is similar in construction to circuit 704, buffers and integrates the signal generated by circuit 716. Circuit 720 compares $I_{A1}$, $I_{A2}$, and $I_{A3}$ to produce $I_{RA}$. Additionally, circuit 722, which is similar in construction to circuit 704, buffers and integrates the signal generated by circuit 720.

Board 340 may also be installed in relay 150. When board 340 is installed in relay 150 signals $I_4$ and $I_5$ will be used to generate the through current restraint signal by circuits 720 and 722. Through current restraint signals $I_{RB}$ and $I_{RC}$ which are not produced in relay 150 will not be generated by board 340. A pair of switches 724 and 726, which correspond to switches 207 and 209 in FIG. 4, are also provided on board 340 to direct $I_4$ and $I_5$ to either summing junction 190 or 198 as is shown in FIG. 4.

FIG. 8B shows a lower portion of the phase-shifting analog board 340 including circuitry for shifting the phase of the current signals. Circuit 750 includes jumper pair terminals 752, 754, and 756, and op amp 758. A jumper wire (not shown) connected across jumper pair terminals 752 will shift the phase angle of current signal $I_{A1}$ by 30° at node 760 by op amp 758 summing $I_{A1}$ and $I_{C1}$. This will be required when the transformer 152 is connected as shown in FIG. 2A. If a jumper wire is connected across jumper pair terminals 754, the phase angle of current signal $I_{A1}$ will be shifted by 30° at node 760 by op amp 758 summing $I_{A1}$ and $I_{B1}$. This will be required when the transformer 152 is connected as shown in FIG. 2B. If $I_{A1}$ does not need to be shifted then a jumper wire is connected across jumper pair terminals 756. Circuits 751 and 753 are similar in construction to circuit 750. Circuit 751 shifts the phase angle of current signal $I_{B1}$ and circuit 753 shifts the phase angle of current signal $I_{C1}$. Circuits 762 are similar in construction and function to circuit 750 and are shown in block diagram form. Circuits 750, 751, 753, and 762 are an example of means for shifting the phase angle of the first current signal of at least one phase to match the phase angle of the second current signal of the corresponding phase.

Phase-shifting analog board 340 also includes switches 764–774 for directing the phase-shifted signals to summing junctions 102, 104, or 106. Phase-shifted signals $I_{A1}$, $I_{B1}$, and $I_{C1}$ are not connected to switches because the relay 100 requires that these signals be used to monitor current flowing into the transformer 152.

Figure 9:
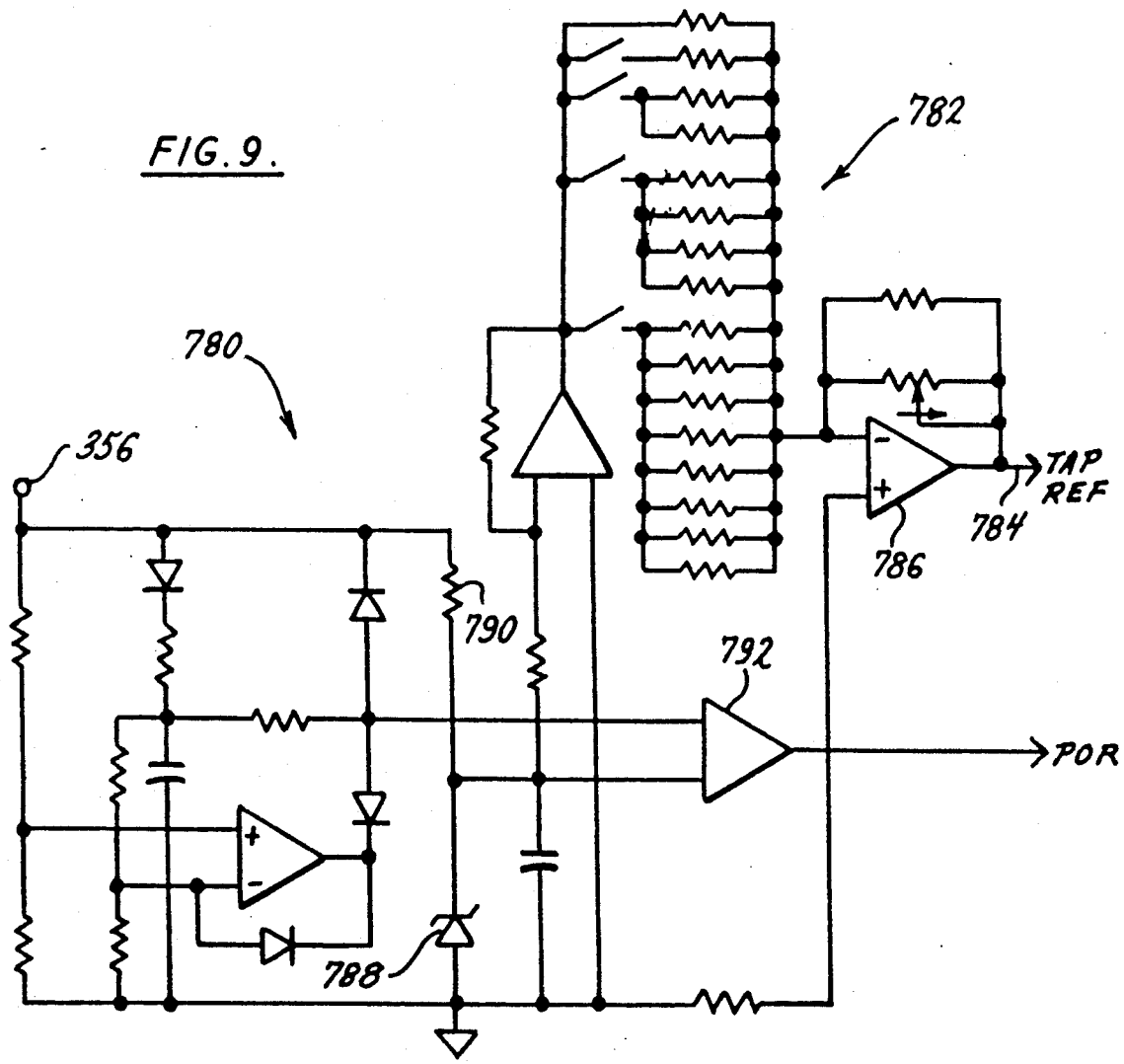
FIG. 9 is a schematic diagram of a circuit for generating a tap reference signal (TAP REF) and a power on reference signal (POR) used in the multifunction analog board of FIGS. 8A and 8B.

Referring now to FIG. 9, the phase-shifting analog board 340 also includes circuitry 780 for producing the unrestrained output or TAP REF signal. A BCD switch 782 having variable resistor values is connected to a rotary switch (not shown) on the front panel of the relay 150. The rotary switch is operated to select the predetermined value against which $I_{OP}$ will be compared to operate the circuit breaker 114. The TAP REF signal is produced at an output 784 of an op amp 786.

The POR signal is generated on phase-shifting analog board 340 by circuitry 780. The POR signal is produced to indicate when the power supply voltage has reached an adequate level to power the internal circuitry of the relay 100. This typically occurs when external operating power is first switched on. The POR signal also warns of impending power supply failure. A zener diode 788 and a resistor 790 provide a reference that allows a comparator 792 to output a positive POR signal which indicates that the power supply voltage is below a required level, i.e., the reference. The positive POR signal inhibits all of the outputs of the relay 100. As soon as the power supply voltage exceeds the reference signal at the zener diode 788, the POR signal goes negative to enable the outputs of the relay 100.

Figure 10A:
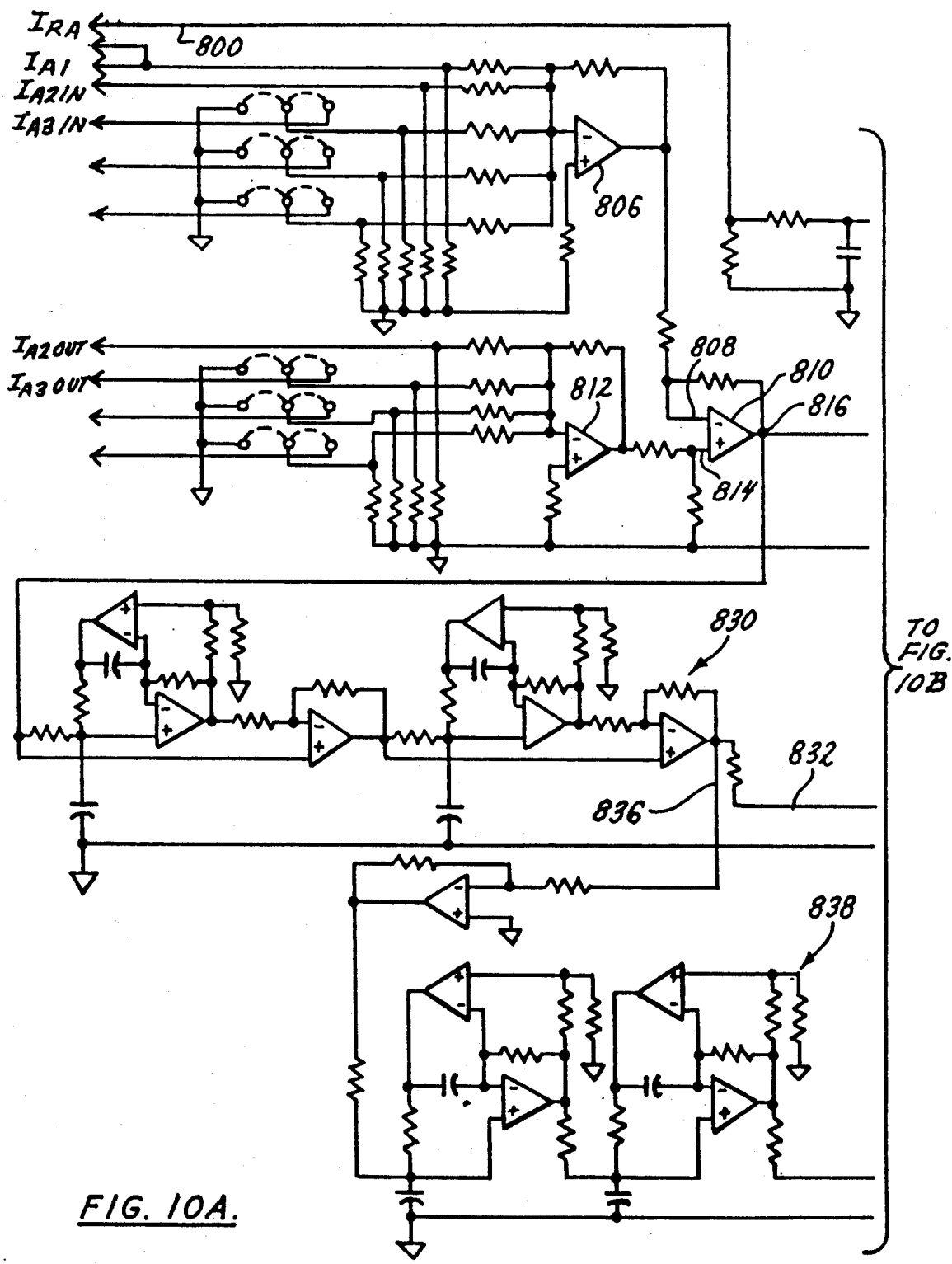
FIGS. 10A-10C are schematic diagrams of one of the multifunction analog boards of FIG. 5B.
Figure 10B:
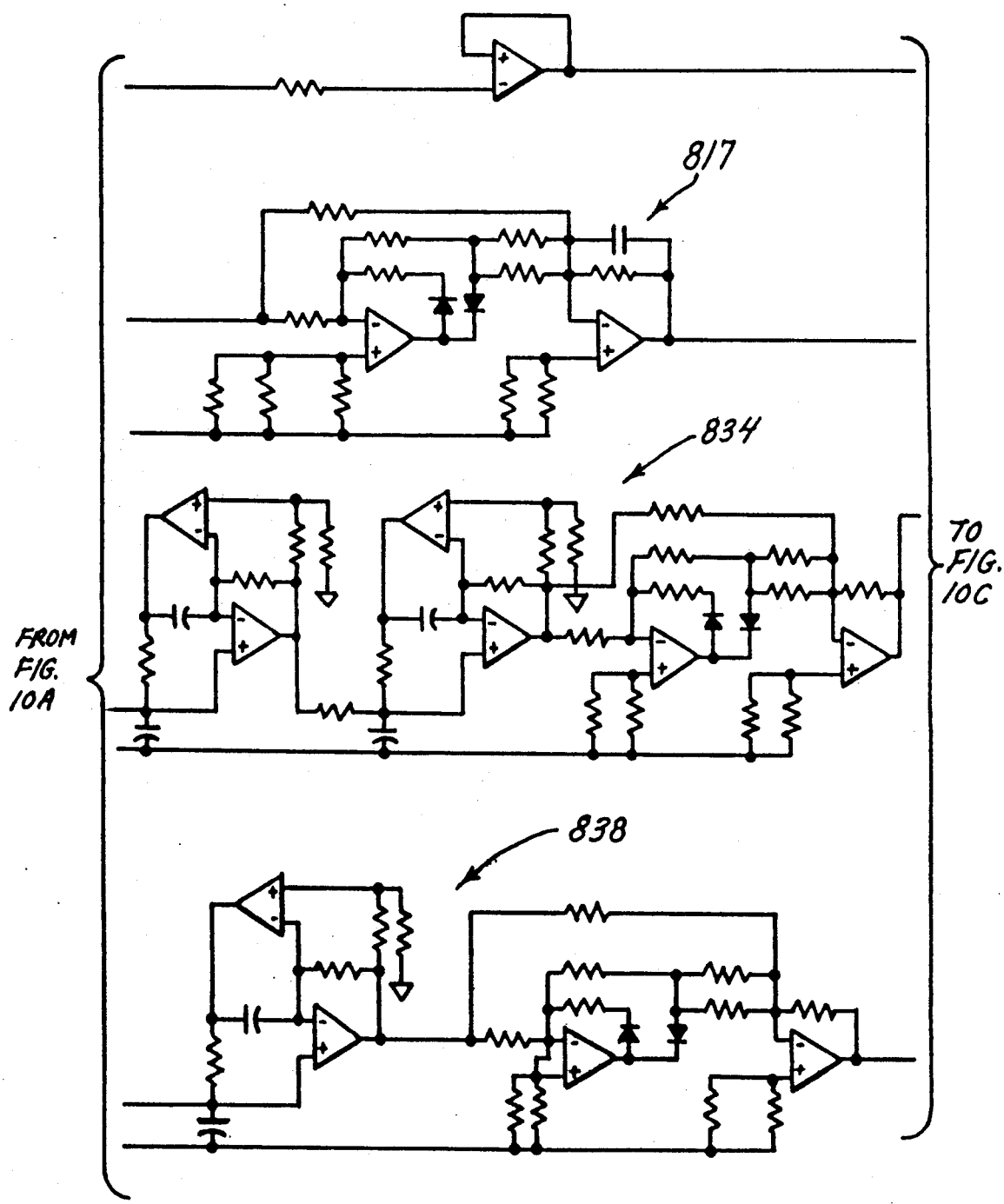
Figure 10C:
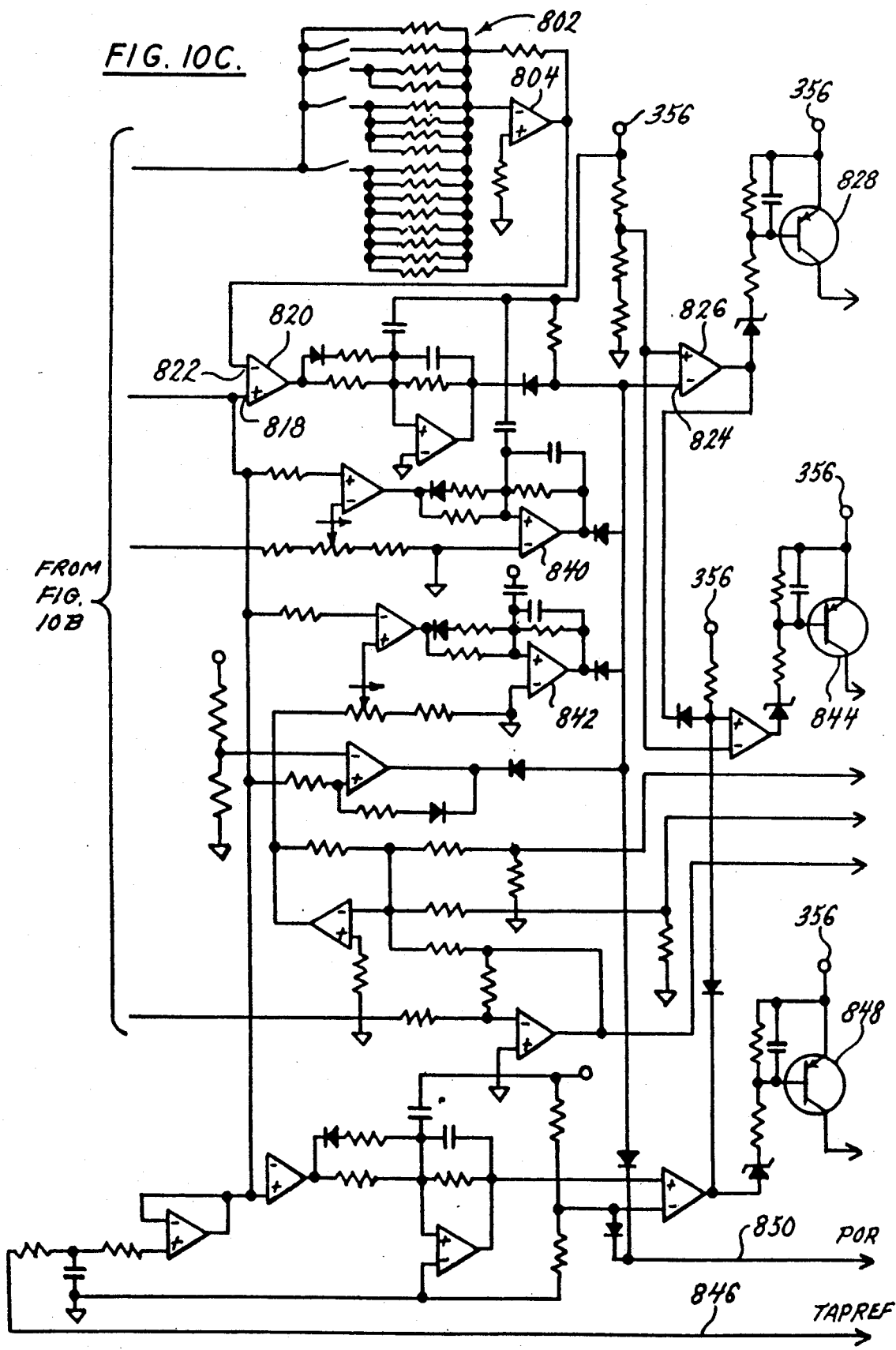

FIGS. 10A–10C show a detailed schematic diagram of multifunction analog board 342. There is one multifunction analog board for each phase included in the relay 100. Since the structure and operation of each multifunction analog board for each phase is the same it is sufficient to describe a multifunction analog board for phase A, for example.

A line 800 receives the phase A current restraint signal $I_{RA}$ from the phase-shifting analog board 340. A BCD switch 802 having various resistor values scales the $I_{RA}$ signal to establish the predetermined percentage of $I_R$ with which $I_{OP}$ is compared against. An example of a range of percentages is 10% to 50%. An op amp 804 generates an output which represents the percentage of $I_{RA}$ (% $I_{RA}$).

Current signals $I_{A1}$, $I_{A2IN}$, and $I_{A3IN}$, which represent the phase A currents flowing into transformer 110, are provided to an op amp 806. Op amp 806 sums these current signals and provides the result to an inverting input 808 of an op amp 810. Current signals $I_{A2}$ OUT and $I_{A3}$ OUT, which represent the phase A currents flowing out of transformer 110, are provided to an op amp 812. Op amp 812 sums these current signals and supplies the result to a non-inverting input 814 of op amp 810. Op amp 810 determines whether there is a difference between the two signals received from op amps 806 and 812. If there is a difference op amp 810 generates an output at node 816 which represents this difference as operating current $I_o$. Op amp 810 is an example of means for detecting a difference between the magnitude of the phase-shifted first current signal of at least one phase and the magnitude of the second current signal of the corresponding phase.

The output at node 816, which is $I_o$, is rectified by circuit 817 and supplied to a non-inverting input 818 of an op amp 820. An inverting input 822 of op amp 820 receives the output from op amp 804, the % $I_{RA}$ signal. Op amp 820 compares $I_{OP}$ with % $I_{RA}$ to determine if $I_{OP}$ is greater than or equal to % $I_{RA}$. If $I_{OP}$ is greater than or equal to % $I_{RA}$ an output from op amp 820 is supplied to an inverting input 824 of an op amp 826. An output from op amp 826 biases a transistor 828 on to generate a signal which operates circuit breaker 114. Transistor 828 is an example of means for activating the disconnect means to disconnect the transformer from the power source when any of the detected differences exceeds the predetermined amount.

The output of op amp 826 can be prevented by restraint signals generated by either a second harmonic restraint unit or a fifth harmonic restraint unit. Development of the harmonic restraint signals is initiated at a 60 Hz band reject filter 830. The input signal of the band reject filter 830 is supplied from the output of op amp 810 at node 816. An output of band reject filter 830 is supplied by a line 832 to a fifth harmonic or 300 Hz band pass filter 834 for generating a fifth harmonic signal. The output of band reject filter 830 is also supplied by a line 836 to a second harmonic or 120 Hz band pass filter 838 for generating a second harmonic signal.

The fifth harmonic signal is compared against a predetermined percentage of $I_{OP}$ at an op amp 840. If the predetermined percentage of $I_{OP}$ is less than or equal to the fifth harmonic signal then the output of op amp 840 will inhibit the op amp 826 from biasing transistor 828 on. Additionally, the second harmonic signal is compared against a predetermined percentage of $I_{OP}$ (% $I_{OP}$). If this % $I_{OP}$ is less than or equal to the second harmonic signal then the output of op amp 842 will inhibit the op amp 826 from biasing transistor 828 on.

Multifunction board assembly 342 also includes a transistor 844 which when biased on will operate an indicator (not shown) for indicating that the fault condition occurred in phase A.

Additionally, multifunction analog board 342 receives the TAP REF signal from phase-shifting analog board 340 over a line 846. The TAP REF signal controls a transistor 848 for generating an unrestrained output signal for operating the circuit breaker 114. Multifunction analog board 343 also receives the POR signal from phase-shifting analog board 340 over a line 850.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. An apparatus for monitoring currents in a transformer in each of three phases of a first winding thereof and currents in each of three corresponding phases of a second winding coupled to the first winding and for actuating a disconnect means to disconnect the transformer from a three-phase power source supplying it when a difference between the magnitude of the current in any of the phases of the first winding and the magnitude of the current in the corresponding phase of the second winding exceeds a predetermined amount indicative of a fault condition, said apparatus for use in combination with means for generating at least one first current signal and at least one second current signal, each corresponding to one of the currents in one of the phases of the first and second windings, respectively, each said current signal having a phase angle which is a function of the phase angle of its corresponding current and having a magnitude which is a function of the magnitude of its corresponding current, the apparatus comprising:

means for shifting the phase angle of the first current signal of at least one phase to match the phase angle of the second current signal of the corresponding phase;

means for detecting a difference between the magnitude of the phase-shifted first current signal of at least one phase and the magnitude of the second current signal of the corresponding phase; and means for actuating the disconnect means to disconnect the transformer from the power source when any of the detected differences exceeds the predetermined amount.

2. The apparatus of claim 1 wherein the apparatus monitors currents in each of three phases of a third winding coupled to the first winding, the three phases of the third winding corresponding to the three phases of the first winding, and further comprising means for generating a plurality of third current signals, each corresponding to one of the currents in one of the phases of the third winding, each said third current signal having a phase angle which is a function of the phase angle of its corresponding current and having a magnitude which is a function of the magnitude of its corresponding current, and wherein said means for detecting detects a difference between the magnitude of the phase-shifted first current signal of at least one phase and the sum of the magnitudes of the second current signal and the third current signal of the corresponding phase.

3. The apparatus of claim 2 further comprising means for shifting the phase angle of the third current signal of at least one phase to match the phase angle of the second current signal of the corresponding phase.

4. The apparatus of claim 2 further comprising means for shifting the phase angle of the third current signal of at least one phase to match the phase angle of the first current signal of the corresponding phase.

5. The apparatus of claim 1 wherein the apparatus monitors currents in each of three phases of a third winding coupled to the second winding, the three phases of the third winding corresponding to the three phases of the second winding, and further comprising means for generating a plurality of third current signals, each corresponding to one of the currents in one of the phases of the third winding, each said third current signal having a phase angle which is a function of the phase angle of its corresponding current and having a magnitude which is a function of the magnitude of its corresponding current, and wherein said means for detecting detects a difference between the magnitude of the second current signal of at least one phase and the sum of the magnitudes of the phase-shifted first current signal and the third current signal of the corresponding phase.

6. The apparatus of claim 5 further comprising means for shifting the phase angle of the third current signal of at least one phase to match the phase angle of the second current signal of the corresponding phase.

7. The apparatus of claim 5 further comprising means for shifting the phase angle of the third current signal of at least one phase to match the phase angle of the first current signal of the corresponding phase.

8. The apparatus of claim 1 further comprising means for generating a plurality of third current signals each corresponding to one of the currents in one of the phases of the second winding, each said third current signal having a phase angle which is a function of the phase angle of its corresponding current and having a magnitude which is a function of its corresponding current, and wherein said means for detecting detects a difference between the magnitude of the phase-shifted first current signal of at least one phase and the sum of the magnitudes of the second current signal and the third current signal of the corresponding phase.

9. The apparatus of claim 1 further comprising means for generating a plurality of third current signals each corresponding to one of the currents in one of the phases of the first winding, each said third current signal having a phase angle which is a function of the phase angle of its corresponding current and having a magnitude which is a function of its corresponding current, and wherein said means for detecting detects a difference between the magnitude of the second current signal of at least one phase and the sum of the magnitudes of the phase-shifted first current signal and the third current signal of the corresponding phase.

10. The apparatus of claim 1 further comprising means for scaling the magnitude of the first current signal of said one phase in accordance with a scaling factor, the scaling means comprising means having a variable resistance for modifying the scaling factor; and wherein said detecting means detects a difference between the magnitude of the scaled phase-shifted first current signal of said one phase and the magnitude of the second current signal of the corresponding phase.

11. The apparatus of claim 10 wherein the scaling means further comprises a plurality of fixed resistances, each in series with the first current signal of at least one phase and a plurality of first binary coded decimal (BCD) switches, each connected in parallel with one of the fixed resistances, each said switch having a plurality of positions wherein each position connects a resistance in parallel to its parallel fixed resistance having a value which is an integer multiple of its parallel fixed resistance.

12. The apparatus of claim 11 wherein the scaling means further comprises a plurality of second binary coded decimal (BCD) switches, each connected in parallel with one of the fixed resistances and its parallel first BCD switch, each said switch having a plurality of positions wherein each position connects a resistance in parallel to its parallel fixed resistance and first BCD switch having a value which is an integer multiple of its parallel fixed resistance and first BCD switch.

13. The apparatus of claim 12 wherein the fixed resistances and the first BCD switches are adapted to scale the magnitude of the first current signal of at least one phase by a first factor and the second BCD switches are adapted to scale the magnitude of the first current signal of at least one phase by a second factor different from the first factor.

14. The apparatus of claim 13 wherein the first factor is a positive integer and the second factor is tenths of a positive integer.

15. The apparatus of claim 10 wherein the scaling factor is in the range of 2.0 to 8.9.

16. The apparatus of claim 1 further comprising means for scaling the magnitude of the second current signal of said one phase in accordance with a scaling factor, the scaling means comprising means having a variable resistance for modifying the scaling factor; and wherein said detecting means detects a difference between the magnitude of the phase-shifted first current signal of said one phase and the magnitude of the scaled second current signal of the corresponding phase.

17. The apparatus of claim 16 wherein the scaling means further comprises a plurality of second fixed resistances, each in series with the second current signal of at least one phase and a plurality of third binary coded decimal (BCD) switches, each connected in parallel with one of the second fixed resistances, each said switch having a plurality of positions wherein each position connects a resistance in parallel to its parallel second fixed resistance having a value which is an integer multiple of its parallel second fixed resistance.

18. The apparatus of claim 17 wherein the scaling means further comprises a plurality of fourth binary coded decimal (BCD) switches, each connected in Parallel with one of the second fixed resistances and its parallel third BCD switch, each said switch having a plurality of positions wherein each position connects a resistance in parallel to its parallel second fixed resistance and third BCD switch having a value which is an integer multiple of its parallel second fixed resistance and third BCD switch.

19. The apparatus of claim 18 wherein the second fixed resistances and the third BCD switches are adapted to scale the magnitude of the second current signal of at least one phase by a third factor and the fourth BCD switches are adapted to scale the magnitude of the second current signal of at least one phase by a fourth factor different from the third factor.

20. The apparatus of claim 19 wherein the third factor is a positive integer and the fourth factor is tenths of a positive integer.

21. The apparatus of claim 1 wherein the first winding is delta-connected and the second winding is Y-connected.

22. A protective relay for monitoring currents in a transformer in each of three phases of a first winding thereof and currents in each of three corresponding phases of a second winding coupled to the first winding, the relay comprising:
means for generating a plurality of first current signals and a plurality of second current signals, each corresponding to one of the currents in one of the phases of the first and second windings, respectively, each said current signal having a phase angle which is a function of the phase angle of its corresponding current and having a magnitude which is a function of the magnitude of its corresponding current;
means for scaling the magnitude of the first and second current signals;
means for shifting the phase angle of the scaled first current signal of at least one phase to match the phase angle of the scaled second current signal of the corresponding phase;
means for detecting a difference between the magnitude of the scaled phase-shifted first current signal and the magnitude of the scaled second current signal of the corresponding phase; and
means for disconnecting the transformer from a three-phase power source supplying the transformer when any of the detected differences exceeds a predetermined amount.

23. The relay of claim 22 wherein the relay monitors currents in each of three phases of a third winding coupled to the first winding, the three phases of the third winding corresponding to the three phases of the first winding, and further comprising means for generating a plurality of third current signals, each corresponding to one of the currents in one of the phases of the third winding, each said third current signal having a phase angle which is a function of the phase angle of its corresponding current and having a magnitude which is a function of the magnitude of its corresponding current, and wherein said means for detecting detects a difference between the magnitude of the scaled phase-shifted first current signal of at least one phase and the sum of the magnitudes of the scaled second current signal and the third current signal of the corresponding phase.

24. The relay of claim 23 further comprising means for shifting the phase angle of the third current signal of at least one phase to match the phase angle of the second current signal of the corresponding phase.

25. The relay of claim 23 further comprising means for shifting the phase angle of the third current signal of at least one phase to match the phase angle of the first current signal of the corresponding phase.

26. The relay of claim 22 wherein the relay monitors currents in each of three phases of a third winding coupled to the second winding, the three phases of the third winding corresponding to the three phases of the second winding, and further comprising means for generating a plurality of third current signals, each corresponding to one of the currents in one of the phases of the third winding, each said third current signal having a phase angle which is a function of the phase angle of its corresponding current and having a magnitude which is a function of the magnitude of its corresponding current, and wherein said means for detecting detects a difference between the magnitude of the second current signal of at least one phase and the sum of the magnitudes of the phase-shifted first current signal and the third current signal of the corresponding phase.

27. The relay of claim 26 further comprising means for shifting the phase angle of the third current signal of at least one phase to match the phase angle of the second current signal of the corresponding phase.

28. The relay of claim 26 further comprising means for shifting the phase angle of the third current signal of at least one phase to match the phase angle of the first current signal of the corresponding phase.

29. The relay of claim 22 further comprising means for generating a plurality of third current signals each corresponding to one of the currents in one of the phases of the second winding, each said third current signal having a phase angle which is a function of the phase angle of its corresponding current and having a magnitude which is a function of its corresponding current, and wherein said means for detecting detects a difference between the magnitude the phase-shifted first current signal of at least one phase and the sum of the magnitudes of the second current signal and the third current signal of the corresponding phase.

30. The relay of claim 22 further comprising means for generating a plurality of third current signals each corresponding to one of the currents in one of the phases of the first winding, each said third current signal having a phase angle which is a function of the phase angle of its corresponding current and having a magnitude which is a function of its corresponding current, and wherein said means for detecting detects a difference between the magnitude of each second current signal of at least one phase and the sum of the magnitudes of the first current signal and the third current signal of the corresponding phase.

31. The relay of claim 22 wherein the scaling means comprises a plurality of fixed resistances, each in series with the first current signal of at least one phase and a plurality of first binary coded decimal (BCD) switches, each connected in parallel with one of the fixed resistances, each said switch having a plurality of positions wherein each position connects a resistance in parallel to its parallel fixed resistance having a value which is an integer multiple of its parallel fixed resistance.

32. The relay of claim 31 wherein the scaling means further comprises a plurality of second binary coded decimal (BCD) switches, each connected in parallel with one of the fixed resistances and its parallel first BCD switch, each said switch having a plurality of positions wherein each position connects a resistance in parallel to its parallel fixed resistance and first BCD switch having a value which is an integer multiple of its parallel fixed resistance and first BCD switch.

33. The relay of claim 32 wherein the fixed resistances and the first BCD switches are adapted to scale the magnitude of the first current signal of at least one phase by a first factor and the second BCD switches are adapted to scale the magnitude of the first current signal of at least one phase by a second factor different from the first factor.

34. The relay of claim 33 wherein the first factor is a positive integer and the second factor is tenths of a positive integer.

35. The relay of claim 22 wherein the scaling means further comprises a plurality of second fixed resistances, each in series with the second current signal of at least one phase and a plurality of third binary coded decimal (BCD) switches, each connected in parallel with one of the second fixed resistances, each said switch having a plurality of positions wherein each position connects a resistance in parallel to its parallel second fixed resistance having a value which is an integer multiple of its parallel second fixed resistance.

36. The relay of claim 35 wherein the scaling means further comprises a plurality of fourth binary coded decimal (BCD) switches, each connected in parallel with one of the second fixed resistances and its parallel third BCD switch, each said switch having a plurality of positions wherein each position connects a resistance in parallel to its parallel second fixed resistance and third BCD switch having a value which is an integer multiple of its parallel second fixed resistance and third BCD switch.

37. The relay of claim 36 wherein the second fixed resistances and the third BCD switches are adapted to scale the magnitude of the second current signal of at least one phase by a third factor and the fourth BCD switches are adapted to scale the magnitude of the second current signal of at least one phase by a fourth factor different from the third factor.

38. The relay of claim 37 wherein the third factor is a positive integer and the fourth factor is tenths of a positive integer.

39. The relay of claim 22 wherein the first winding is delta-connected and the second winding is Y-connected.

40. The relay of claim 22 wherein the shifting means comprises a plurality of operational amplifiers, each having an input connected to the scaled first current signal of at least one phase and adapted to generate an output signal which represents the phase angle of the scaled first current signal shifted by a predetermined amount.

41. The relay of claim 40 wherein the predetermined amount is 30°.

42. A system for operating a circuit breaker to disconnect a transformer from a three-phase power source supplying the transformer in response to the detection of an internal fault in the transformer, the system comprising:
means for generating a plurality of first current signals and a plurality of second current signals, each corresponding to one of the currents in one of the phases of a first winding of the transformer and the currents in the corresponding phases of a second winding coupled to the first winding, respectively, each said current signal having a phase angle which is a function of the phase angle of its corresponding current and having a magnitude which is a function of the magnitude of its corresponding current;
means for scaling the magnitude of the first and second current signals;
means for shifting the phase angle of the scaled first current signal of at least one phase to match the scaled second current signal of the corresponding phase;
means for detecting a difference between the magnitude of the scaled phase-shifted first current signal of at least one phase and the magnitude of the scaled second current signal of the corresponding phase and for producing an output signal when any of the detected differences exceeds a predetermined amount; and
means for disconnecting the transformer from the power source in response to the output signal.

43. An apparatus for monitoring phased currents in a first winding magnetically coupled to a second winding of a transformer and for disconnecting the transformer from a power source supplying the transformer when a difference between the magnitude of the current in the first winding and the magnitude of the current in the second winding indicates a fault, the apparatus comprising: means for generating first and second current signals each having a phase and magnitude which is a function of the phase and magnitude of the phased currents in the first and second windings, respectively;
means having a variable resistance for scaling the magnitude of the first current signal in accordance with a scaling factor;
means for detecting a difference between the magnitude of the scaled first current signal and the magnitude of the second current signal; and
means for disconnecting the transformer from the power source when the detected difference indicates the fault.

44. The apparatus of claim 43 wherein the apparatus monitors phased currents in a third winding magnetically coupled to the first winding and further comprising means for generating a third signal having a phase and magnitude which is a function of the phase and magnitude of the phased currents in the third winding, and wherein said means for detecting detects a difference between the magnitude of the scaled first current signal and the sum of the magnitudes of the second current signal and the third current signal.

45. The apparatus of claim 43 wherein the apparatus monitors phased currents in a third winding magnetically coupled to the second winding and further comprising means for generating a third signal having a phase and magnitude which is a function of the phase and magnitude of the phased currents in the third winding, and wherein said means for detecting detects a difference between the magnitude of the second current signal and the sum of the magnitudes of the scaled first current signal and the third current signal.

46. The apparatus of claim 43 wherein the scaling means further comprises a fixed resistance in series with the first current signal and a first binary coded decimal (BCD) switch connected in parallel with the fixed resistance, the switch having a plurality of positions, wherein each position connects a resistance in parallel to the fixed resistance having a value which is an integer multiple of the fixed resistance.

47. The apparatus of claim 46 wherein the scaling means further comprises a second binary coded decimal (BCD) switch connected in parallel with the fixed resistance and its parallel first BCD switch, the switch having a plurality of positions, wherein each position connects a resistance in parallel to the fixed resistance and its first BCD switch having a value which is an integer multiple of the fixed resistance and its first BCD switch.

48. The apparatus of claim 47 wherein the fixed resistance and the first BCD switch are adapted to scale the magnitude of the first current signal by a first factor and the second BCD switch is adapted to scale the magnitude of the first current signal by a second factor different from the first factor.

49. The apparatus of claim 47 wherein the first factor is a positive integer and the second factor is tenths of a positive integer.

50. The apparatus of claim 43 further comprising means having a second variable resistance for scaling the magnitude of the second current signal in accordance with a second scaling factor.

51. The apparatus of claim 50 wherein the scaling means further comprises a second fixed resistance in series with the second current signal and a third binary coded decimal (BCD) switch connected in parallel with the second fixed resistance, the switch having a plurality of positions, wherein each position connects a resistance in parallel to the second fixed resistance having a value which is an integer multiple of the second fixed resistance.

52. The apparatus of claim 51 wherein the scaling means further comprises a fourth binary coded decimal (BCD) switch connected in parallel with the second fixed resistance and its parallel third BCD switch, the switch having a plurality of positions, wherein each position connects a resistance in parallel to the second fixed resistance and its third BCD switch having a value which is an integer multiple of the second fixed resistance and its third BCD switch.

53. The apparatus of claim 52 wherein the second fixed resistance and the third BCD switch are adapted to scale the magnitude of the second current signal by a third factor the fourth BCD switch is adapted to scale the magnitude of the second current signal by a fourth factor different from the third factor.

54. The apparatus of claim 53 wherein the third factor is a positive integer and the fourth factor is tenths of a positive integer.

55. The apparatus of claim 43 wherein the scaling factor is in the range of 2.0 to 8.9.

56. The apparatus of claim 50 wherein the second scaling factor is in the range of 2.0 to 8.9.

* * * * *